(12) United States Patent
Nishihara et al.

(10) Patent No.: US 10,397,084 B2
(45) Date of Patent: Aug. 27, 2019

(54) TRANSMISSION DEVICE AND SETTING METHOD

(71) Applicant: FUJITSU LIMITED, Kawasaki-shi, Kanagawa (JP)

(72) Inventors: Masato Nishihara, Kawasaki (JP); Tomoo Takahara, Kawasaki (JP); Toshiki Tanaka, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 596 days.

(21) Appl. No.: 15/084,614

(22) Filed: Mar. 30, 2016

(65) Prior Publication Data
US 2016/0352609 A1 Dec. 1, 2016

(30) Foreign Application Priority Data
May 29, 2015 (JP) .................................. 2015-110649

(51) Int. Cl.
*G06F 15/173* (2006.01)
*H04L 12/26* (2006.01)
(Continued)

(52) U.S. Cl.
CPC ............... *H04L 43/10* (2013.01); *H04L 1/20* (2013.01); *H04L 12/42* (2013.01)

(58) Field of Classification Search
CPC .......... H04L 43/10; H04L 67/12; H04M 3/42; H04M 11/062
See application file for complete search history.

(56) References Cited

U.S. PATENT DOCUMENTS

2007/0086332 A1 4/2007 Way et al.
2009/0279638 A1* 11/2009 Kurobe ................. H04L 1/0003
375/295
(Continued)

FOREIGN PATENT DOCUMENTS

EP 2717500 A2 4/2014
JP 2011-250414 12/2011

OTHER PUBLICATIONS

D. Lewis, et al., "400GE DMT Multi-Vendor Interoperability Requirements", <http://www.ieee802.org/3/bs/public/15_01/corbeil_3bs_01_0115.pdf> (17 pages).
(Continued)

*Primary Examiner* — Moustafa M Meky
*Assistant Examiner* — Kidest Mendaye
(74) *Attorney, Agent, or Firm* — Fujitsu Patent Center

(57) ABSTRACT

A transmission device connects a plurality of transmission device by a ring network. The transmission device includes a generating unit, a transmission unit, a determination unit, and a setting unit. The generating unit generates a test signal. The transmission unit transmits the generated test signal to a first transmission device provided immediately downstream in the ring network. The determination unit determines whether a transmission characteristic of the own device on the basis of the test signal measured by the first transmission device is acquired from a second transmission device provided immediately upstream by rounding the ring network. The setting unit sets, on the basis of the acquired transmission characteristic when the transmission characteristic of the own device is acquired, a control level related to the transmission performed by the transmission unit.

9 Claims, 19 Drawing Sheets

(51) Int. Cl.
   *H04L 1/20*   (2006.01)
   *H04L 12/42*  (2006.01)

(56) References Cited

U.S. PATENT DOCUMENTS

| | | | |
|---|---|---|---|
| 2009/0296611 A1* | 12/2009 | Monk | H04L 5/0007 370/294 |
| 2011/0309842 A1* | 12/2011 | Behzad | G01R 31/3025 324/501 |
| 2012/0195588 A1* | 8/2012 | Way | H04J 14/0204 398/4 |
| 2013/0251012 A1* | 9/2013 | Fujimori | H04L 1/0001 375/224 |
| 2014/0099114 A1* | 4/2014 | Nishihara | H04J 4/0256 398/67 |
| 2014/0169425 A1* | 6/2014 | Kolze | H04L 5/0007 375/222 |

OTHER PUBLICATIONS

EESR—Extended European Search Report dated Nov. 2, 2016 for European Patent Application No. 16160872.4.

* cited by examiner

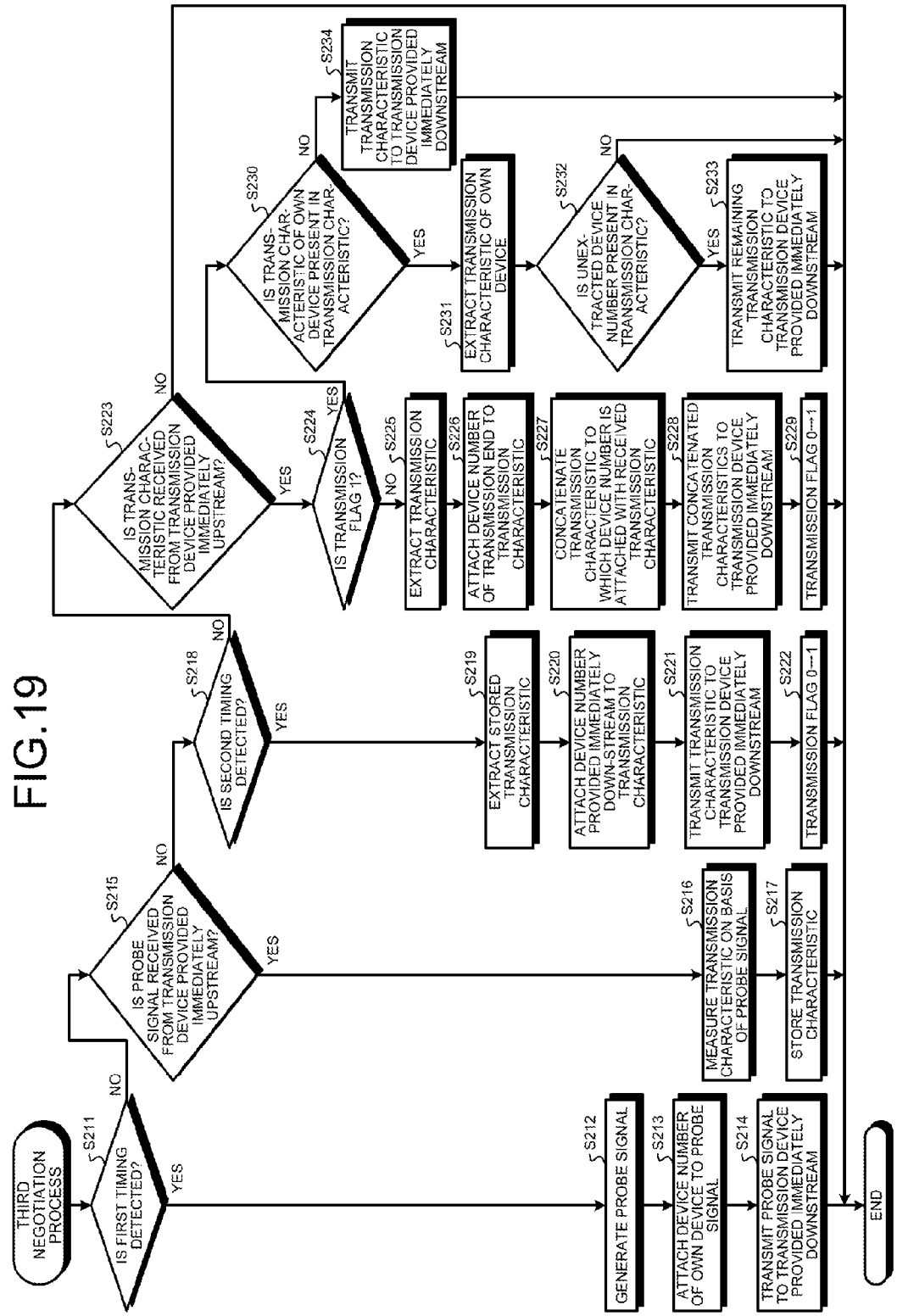

TRANSMISSION DEVICE AND SETTING METHOD

CROSS-REFERENCE TO RELATED APPLICATION

This application is based upon and claims the benefit of priority of the prior Japanese Patent Application No. 2015-110649, filed on May 29, 2015, the entire contents of which are incorporated herein by reference.

FIELD

The embodiments discussed herein are directed to a transmission device and a setting method.

BACKGROUND

In recent years, a transmission system that performs optical transmission of large volumes of data by using an optical network is desired. In a transmission system for optical networks, for example, a multicarrier modulation technique, such as a discrete multi-tone (DMT) modulation technique or the like, is known. The DMT modulation technique is one of the multi carrier transmission technologies based on the orthogonal frequency division multiplexing (OFDM) technology. The DMT modulation technique is a technology that allocates data to subcarriers (SCs) with a plurality of different frequencies, that modulates the data allocated to each SC on the basis of the modulation level and the allocation amount of signal power, and that transmits the data as DMT signals at a high speed.

A transmission device used in The DMT modulation technique transmits, at the time of a startup of a system or the like, a probe signal to a transmission device on an opposite side. Then, the transmission device on the opposite side measures the transmission characteristic on the basis of the received probe signal and sends the subject transmission characteristic as a reply to the transmission device. Then, the transmission device determines, on the basis of the received transmission characteristic, the modulation level (number of bits) and the allocation amount of signal power for each SC. Then, the transmission device generates a DMT signal by modulating the data allocated to each SC on the basis of the determined modulation level and the allocation amount of signal power for each SC. Namely, by performing a negotiation between transmission devices, stable DMT transmission can be ensured between the transmission devices.

Patent Document 1: Japanese Patent No. 5708252
Non-Patent Document 1: D. Lewis, et al. "400GE DMT Multi-Vendor Interoperability Requirements" http://www.ieee802.org/3/bs/public/15_01/corbeil_3bs_01_0115.pdf If transmission devices are connected by a Point to Point network, because communication is two-way direction communication, the transmission characteristic based on a probe signal between transmission devices can be sent back. Thus, negotiations can be performed with the transmission device on an opposite side. Consequently, stable DMT transmission can be ensured on the basis of the transmission characteristic between the transmission devices.

However, if transmission devices are connected by a ring network, because communication is one-way direction communication, the transmission characteristic obtained on the basis of a probe signal between transmission devices is not able to be sent back. Thus, it is not able to ensure negotiations with the transmission device on an opposite side.

SUMMARY

According to an aspect of an embodiment, a transmission device connects a plurality of transmission devices by a ring network. The transmission device includes a generating unit, a transmission unit, a determination unit and a setting unit. The generating unit generates a test signal. The transmission unit transmits the generated test signal to a first transmission device provided immediately downstream in the ring network. The determination unit determines whether a transmission characteristic of the own device on the basis of the test signal measured by the first transmission device is acquired from a second transmission device provided immediately upstream by rounding the ring network. The setting unit sets, on the basis of the acquired transmission characteristic when the transmission characteristic of the own device is acquired, a control level related to the transmission performed by the transmission unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a flowchart illustrating an example of the operation of a process related to the third negotiation process performed in the control unit in the transmission device.

DESCRIPTION OF EMBODIMENTS

Preferred embodiments of the present invention will be explained with reference to accompanying drawings. The present invention is not limited to the embodiments. Furthermore, the embodiments described below may also be appropriately used in combination as long as processes do not conflict with each other.

[a] First Embodiment

Figure 1:
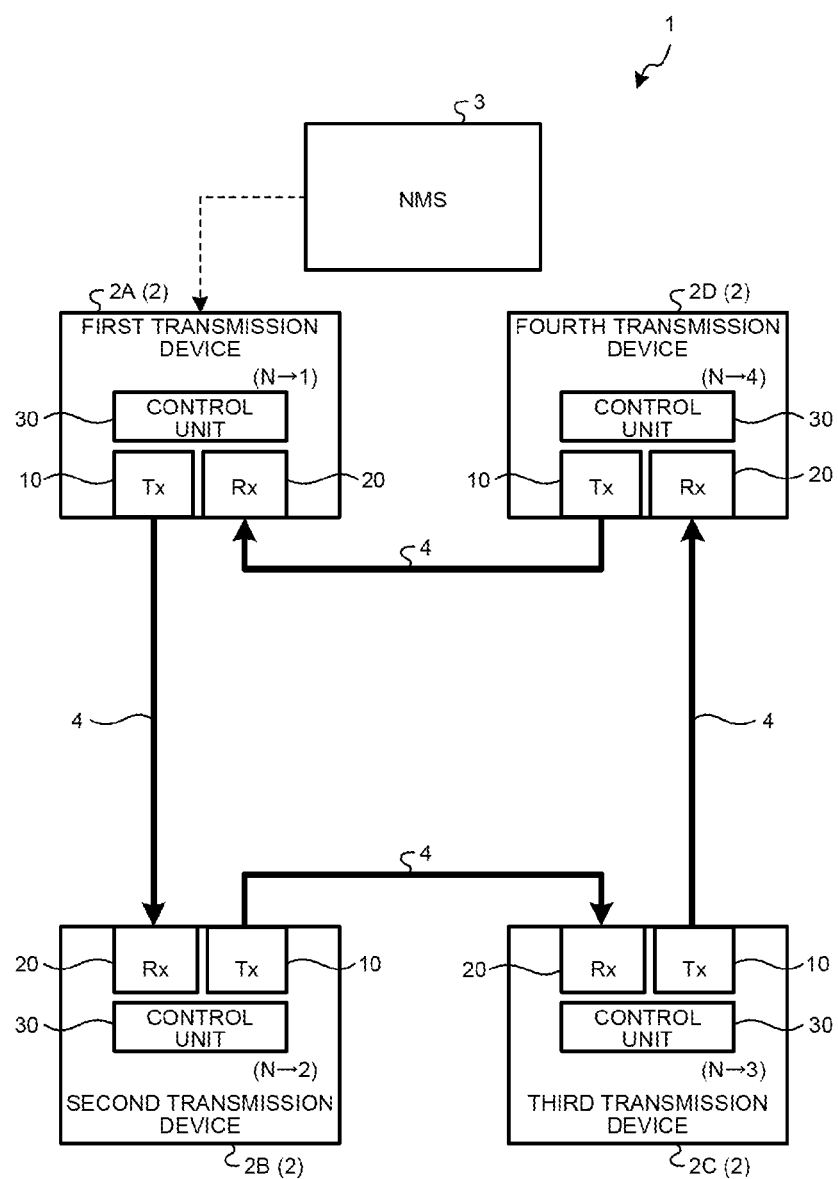
FIG. 1 is a diagram illustrating an example of an optical transmission system according to a first embodiment.

FIG. 1 is a diagram illustrating an example of an optical transmission system according to a first embodiment. An optical transmission system 1 illustrated in FIG. 1 is a system that includes a plurality of, for example, four transmission devices 2 and a network management system (NMS) 3, that connects the plurality of the transmission devices 2 by optical transmission lines 4, and that sends, as optical transmission, a DMT signal between the transmission devices 2 by using one-way direction communication. The transmission devices 2 are, for example, optical modules or the like accommodated in an optical metro network, an optical access network, optical core network, or the like.

The transmission devices 2 correspond to, for example, DMT transmission devices, such as a first transmission device 2A, a second transmission device 2B, a third transmission device 2C, a fourth transmission device 2D, and the like. In the optical transmission system 1, a ring network is used such that a DMT signal is transmitted, in the one-way direction, in a path starting from the first transmission device 2A→the second transmission device 2B→the third transmission device 2C→the fourth transmission device 2D→the first transmission device 2A→ . . . .

Each of the transmission devices 2 includes a transmission unit (hereinafter, simply referred to as a Tx) 10, a receiving unit (hereinafter, simply referred to as an Rx) 20, and a control unit 30. The Tx 10 allocates data to SCs with a plurality of different frequency, modulates the data for each SC on the basis of both the modulation level and the allocation amount of signal power, and transmits the data as a DMT signal to the optical transmission line 4 at a high speed. The Rx 20 de-modulates the DMT signal received from the optical transmission line 4 and outputs the data allocated to the SCs by separating the data. The control unit 30 controls the overall of the transmission device 2.

Furthermore, the Tx 10 starts negotiation with the transmission device 2 that is provided immediately downstream at the time of, for example, a startup of the system and then transmits a probe signal to the transmission device 2 provided immediately downstream via the optical transmission line 4. Furthermore, the probe signal is a signal that is used for negotiation and that is a test signal in which, for example, the modulation level and the allocation amount of signal power for each SC are the same. Furthermore, when the Rx 20 receives a probe signal from the transmission device 2 that is provided immediately upstream, the Rx 20 measures, on the basis of the probe signal, the transmission characteristic between the transmission device 2 provided immediately upstream and transmits the measured transmission characteristic to the transmission device 2 provided immediately downstream via the optical transmission line 4. Furthermore, when the control unit 30 receives the transmission characteristic of the own device from the Rx 20, the control unit 30 determines, on the basis of the transmission characteristic of the own device, the modulation level and the allocation amount of signal power for each SC.

The NMS 3 is a management device that monitors and controls the first transmission devices 2A to 2D in the optical transmission system 1. The optical transmission lines 4 are, for example, optical fibers that are used for optical transmission of DMT signals between the transmission devices 2.

Figure 2:
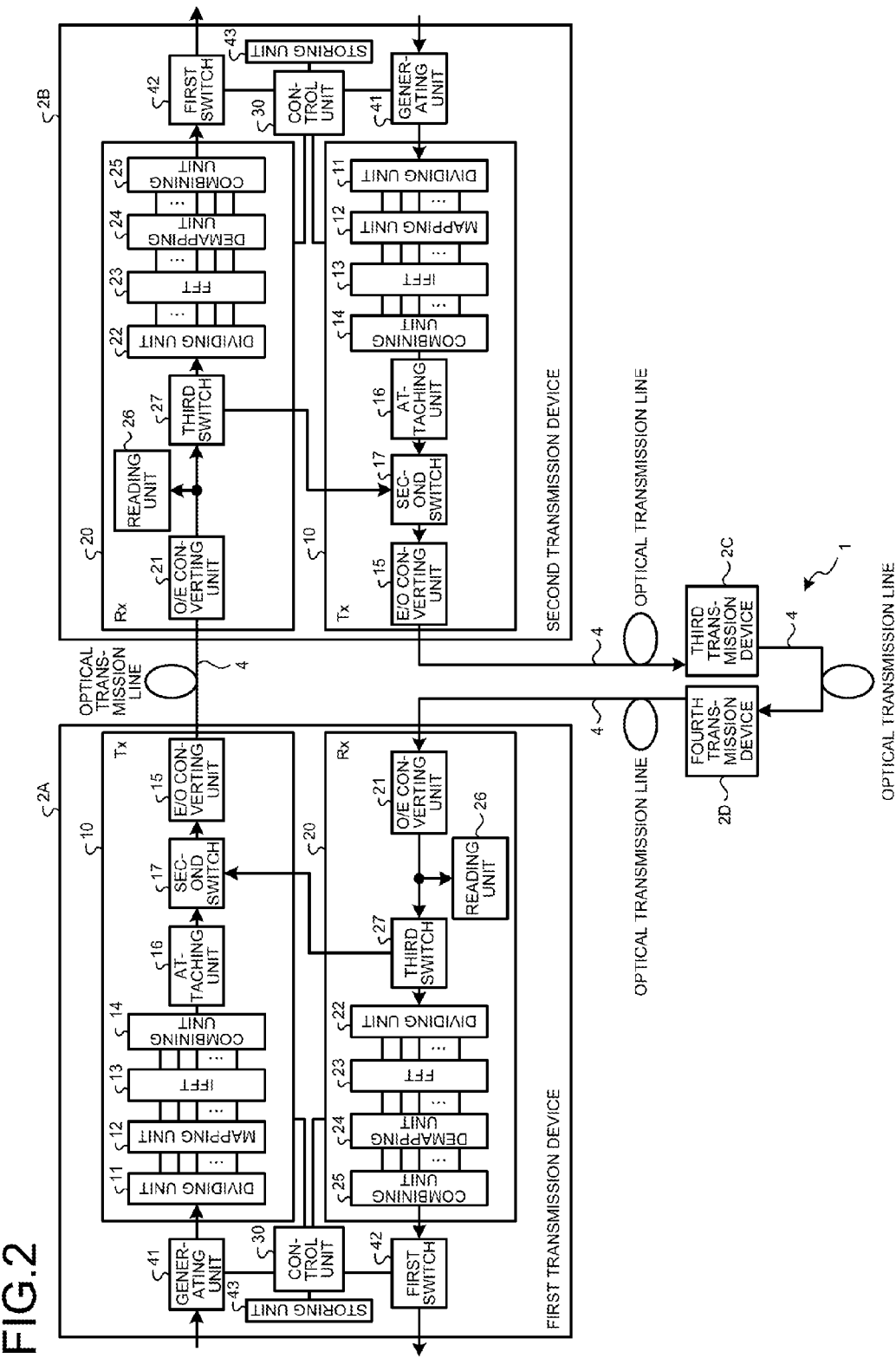
FIG. 2 is a diagram illustrating an example of a transmission device in the optical transmission system.

FIG. 2 is a diagram illustrating an example of a transmission device 2 in the optical transmission system 1. Furthermore, for convenience of explanation, the first transmission device 2A will be described; however, the second transmission device 2B, the third transmission device 2C, and the fourth transmission device 2D have the same configuration as that of the first transmission device 2A. Thus, by assigning the same reference numerals to components having the same configuration as those of the first transmission device 2A, overlapped descriptions thereof will be omitted.

The first transmission device 2A illustrated in FIG. 2 includes, in addition to the Tx 10, the Rx 20, and the control unit 30, a generating unit 41, a first switch 42, and a storing unit 43. The generating unit 41 generates data, such as a probe signal, a transmission characteristic, or the like. The first switch 42 is a switch that switches the transmission characteristic of the own device from the received transmission characteristic and outputs the switched transmission characteristic to the control unit 30. The storing unit 43 is an area that stores therein various kinds of information, such as a device number or the like that is identification information of the own device that will be described later.

The Tx 10 includes a dividing unit 11, a mapping unit 12, an Inverse Fast Fourier Transform (IFFT) 13, a combining unit 14, an Electric/Optic (E/O) converting unit 15, an attaching unit 16, and a second switch 17. The dividing unit 11 divides transmission data into data the number of pieces of which corresponds to the number of SCs included in a DMT signal. The mapping unit 12 maps, on the basis of the modulation level and the allocation amount of signal power for each SC that is currently set, data allocated to each SC. The IFFT 13 performs an IFFT process, on the basis of the modulation level and the allocation amount of signal power for each SC that is currently set, that decomposes the output mapped data into each SC. The combining unit 14 combines the decomposed data for each SC by the IFFT 13 and then outputs the DMT signal. The E/O converting unit 15 is, for example, a Directly Modulated Laser (DML) that performs electric-optic conversion on the DMT signal and outputs the DMT signal to the optical transmission line 4.

The attaching unit 16 attaches label information to a DMT signal, such as a probe signal or a transmission characteristic at the time of, for example, negotiation. The label information includes, for example, a device number of the transmission end and a process flag. The device number of the transmission end is identification information for identifying the transmission device 2 that is the transmission end that transmits a probe signal. The process flag is a flag for identifying the completion of a measurement process of the transmission characteristic performed on the basis of the probe signal sent from the transmission device 2 that is provided immediately upstream. When the measurement process of the transmission characteristic has been completed, "1" is set to the process flag, whereas, when the measurement process of the transmission characteristic has not been processed, "0" is set to the process flag. The second switch 17 is a switch that is used when the DMT signal received from the transmission device 2 provided immediately upstream is passed and transmitted to the transmission device 2 provided immediately downstream without being de-modulated.

The Rx 20 includes an optic/electric (O/E) converting unit 21, a dividing unit 22, a Fast Fourier Transform (FFT) 23, a demapping unit 24, a combining unit 25, a reading unit 26, and a third switch 27. The O/E converting unit 21 is, for example, a photodiode (PD) that performs electric conversion on a DMT signal when the DMT signal sent from the transmission device 2 provided immediately upstream is received. The dividing unit 22 divides the DMT signal into pieces of data for each SC. The FFT 23 performs the FFT process, on the basis of the modulation level and the allocation amount of signal power for each SC that is currently set, that restores the divided data for each SC to the data at the time before the IFFT process of combining the divided data. The demapping unit 24 demaps the pieces of data for each SC combined by the FFT 23 and acquires the data at the time before the demapping. The combining unit 25 combines each of the pieces of demapped data and outputs the data.

The reading unit 26 reads the label information that is attached to the DMT signal, such as a probe signal or a transmission characteristic at the time of, for example, negotiation. The third switch 27 is a switch that is used when the DMT signal that is received from the transmission device 2 provided immediately upstream is passed and transmitted to the transmission device 2 provided immediately downstream without being de-modulated.

Figure 3:
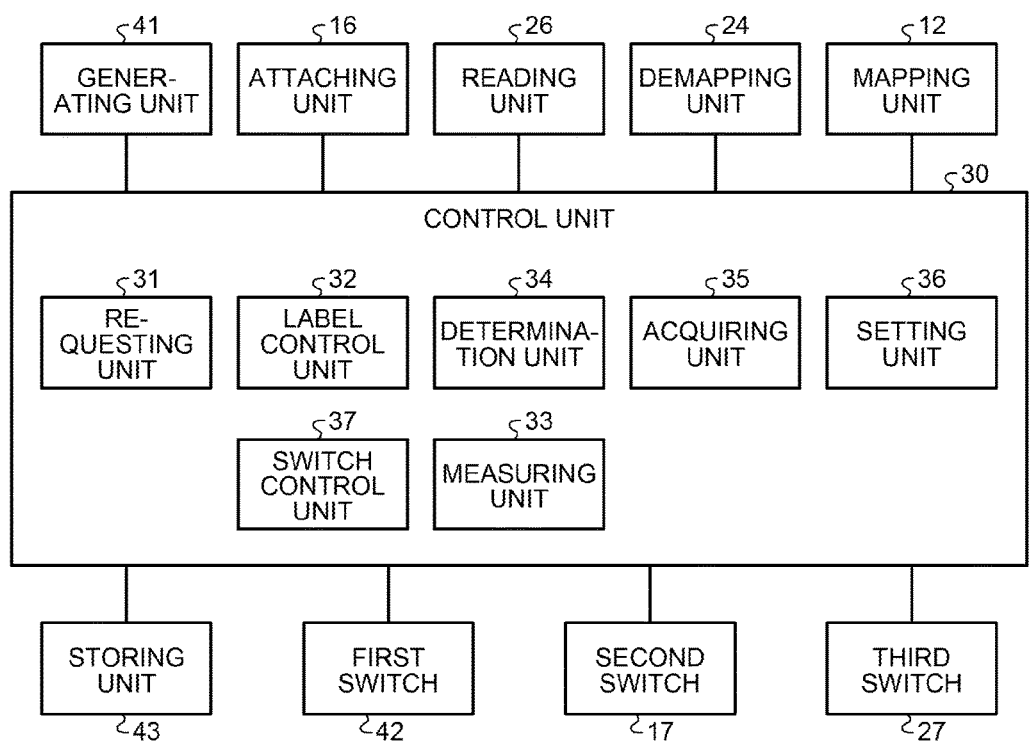
FIG. 3 is a diagram illustrating an example of the functional configuration of a control unit.

FIG. 3 is a diagram illustrating an example of the functional configuration of the control unit 30. The control unit 30 illustrated in FIG. 3 includes a requesting unit 31, a label control unit 32, a measuring unit 33, a determination unit 34, an acquiring unit 35, a setting unit 36, and a switch control unit 37. The requesting unit 31 requests the generating unit 41 to generate a probe signal. The label control unit 32 controls the attaching unit 16 when the label information is attached and controls the reading unit 26 when the label information is read. The measuring unit 33 measures, on the basis of the probe signal sent from the transmission device 2 provided immediately upstream, the transmission characteristic between the transmission device 2 provided immediately upstream. When the determination unit 34 acquires the transmission characteristic from the transmission device 2 provided immediately upstream, the determination unit 34 refers to the device number in the label information in the transmission characteristic and determines whether the transmission characteristic is the transmission characteristic of the own device. The acquiring unit 35 acquires the transmission characteristic of the own device when the transmission characteristic that is acquired from the transmission device 2 provided immediately upstream is the transmission characteristic of the own device. The setting unit 36 determines, on the basis of the acquired transmission characteristic of the own device, the modulation level and the allocation amount of signal power for each SC and sets, in the Tx 10, the determined modulation level and the allocation amount of signal power for each SC. The switch control unit 37 switches and controls the first switch 42, the second switch 17, and the third switch 27. When the switch control unit 37 passes and transmits the DMT signal sent from the transmission device 2 provided immediately upstream to the transmission device 2 provided immediately downstream without modulating on the Rx 20 side, the switch control unit 37 connects the third switch 27 in the Rx 20 to the second switch 17 in the Tx 10. Furthermore, if the transmission characteristic sent from the transmission device 2 provided immediately upstream is the transmission characteristic of the own device, the switch control unit 37 controls the first switch 42 in order to connect to the control unit 30 such that the transmission characteristic of the own device can be acquired.

Figure 4:
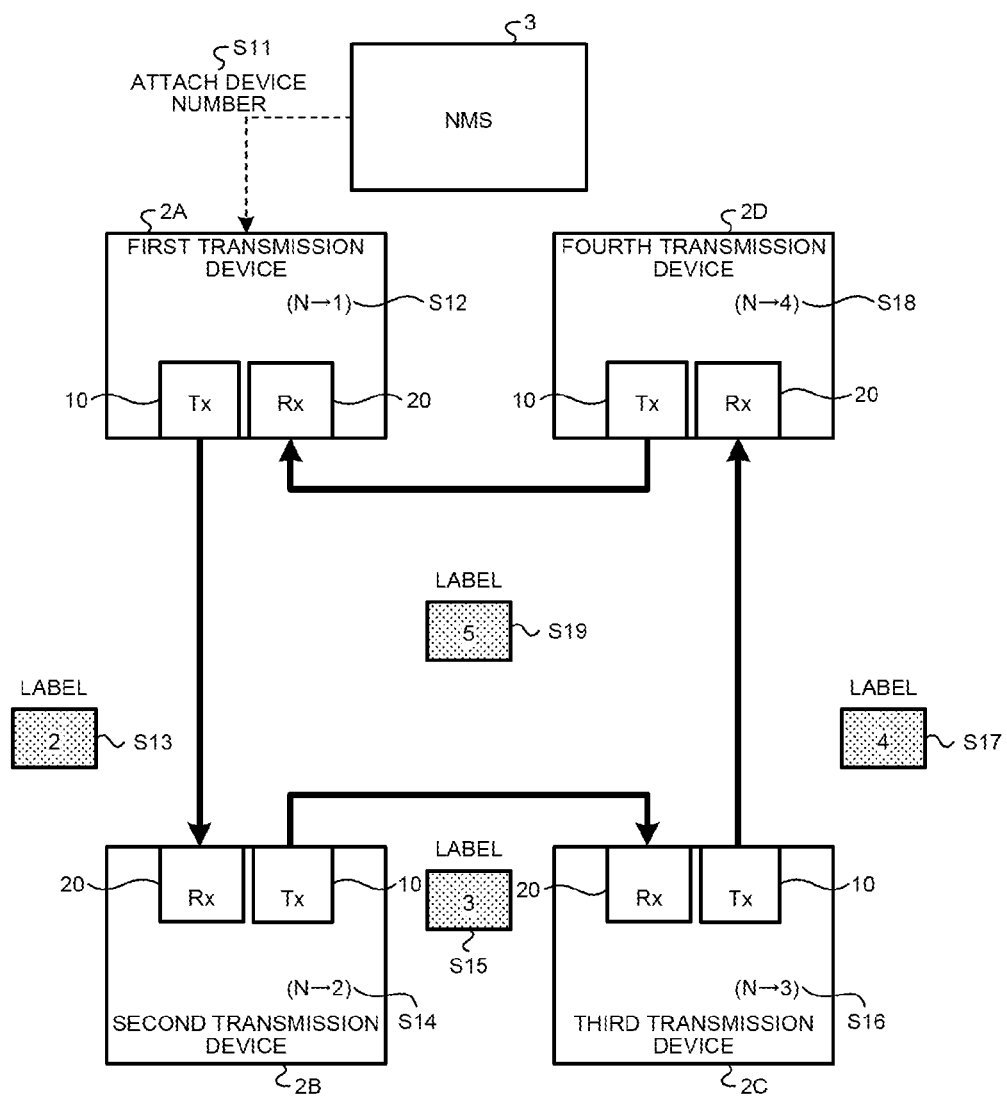
FIG. 4 is a diagram illustrating an example of the operation of a process related to the numbering performed in the optical transmission system.

The operation of the optical transmission system 1 according to the first embodiment will be described. First, the operation performed when a device number is assigned to each of the transmission devices 2 in the ring network will be described. FIG. 4 is a diagram illustrating an example of the operation of a process related to the numbering performed in the optical transmission system 1.

The NMS 3 assigns, at the time of a startup of the system in the ring network, a device number N to the arbitrary transmission device 2 in the ring network, for example, to the first transmission device 2A (Step S11). If "1" is assigned as the device number N by the NMS 3, the first transmission device 2A sets the device number N of the own device to "1" (Step S12). Furthermore, the control unit 30 stores the device number "1" in the storing unit 43. If the device number N is set to "1", the first transmission device 2A increments the device number N by 1 and transmits a label signal "2" obtained from N+1 to the second transmission device 2B (Step S13).

When the second transmission device 2B receives the label signal "2", the second transmission device 2B sets the device number N of the own device to "2" on the basis of the label signal "2" (Step S14). Furthermore, the control unit 30 stores the device number "2" in the storing unit 43. Furthermore, the second transmission device 2B increments the device number N by 1 and transmits the label signal "3" obtained from N+1 to the third transmission device 2C (Step S15). When the third transmission device 2C receives the label signal "3", the third transmission device 2C sets the device number N of the own device to "3" on the basis of the label signal "3" (Step S16). Furthermore, the control unit 30 stores the device number "3" in the storing unit 43. Furthermore, the third transmission device 2C increments the device number N by +1 and transmits the label signal "4" obtained from N+1 to the fourth transmission device 2D (Step S17).

When the fourth transmission device 2D receives a label signal "4", the fourth transmission device 2D sets the device number N of the own device to "4" on the basis of the label signal "4" (Step S18). Furthermore, the control unit 30 stores the device number "4" in the storing unit 43. Furthermore, the fourth transmission device 2D increments the device number N by 1 and transmits the label signal "5" obtained from N+1 to the first transmission device 2A (Step S19). When the first transmission device 2A receives the label signal "5", the first transmission device 2A refers to the storing unit 43 and detects that the device number of the own device has already been set. Thus, the first transmission device 2A decrements the label signal "5" by 1 and calculates the total number of the transmission devices 2 of "4" in the ring network. Then, the first transmission device 2A notifies the NMS 3 of the total number of the transmission devices 2. Then, the first transmission device 2A ends the operation of the numbering. Consequently, the transmission device 2 in the optical transmission system 1 can acquire the device number of the own device.

Figure 5A:
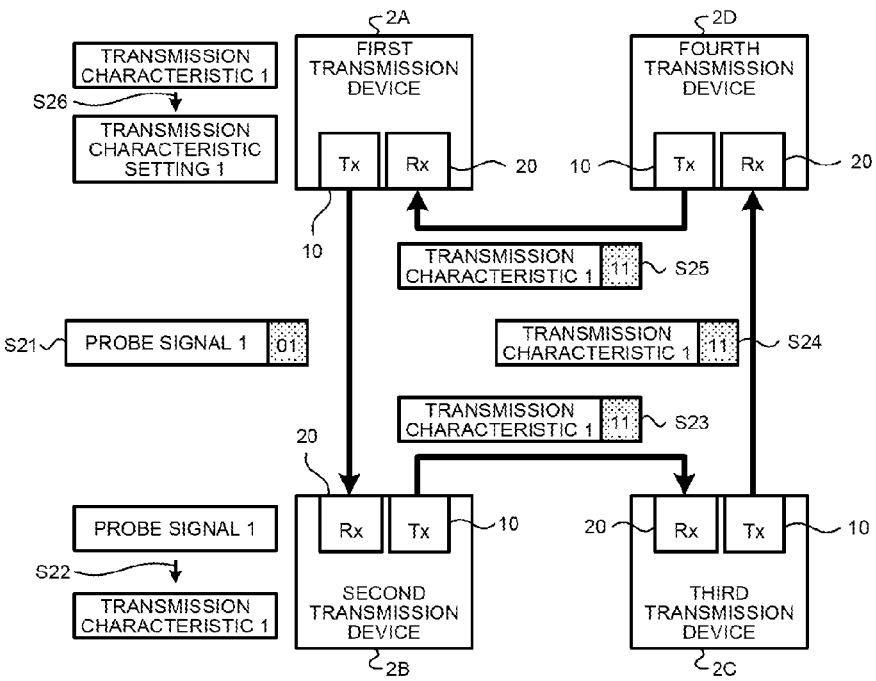
FIG. 5A is a diagram illustrating an example of the operation of a process performed when negotiation of a first transmission device is performed.

FIG. 5A is a diagram illustrating an example of the operation of a process performed when negotiation of the first transmission device 2A is performed. The first transmission device 2A attaches label information "01" to the probe signal that is sent out by the own device. Furthermore, the label information "01" includes a process flag "0" indicating that the transmission characteristic measurement process is unprocessed and includes a device number "1" of the first transmission device 2A that is the transmission end of the probe signal. The first transmission device 2A transmits the probe signal to which the label information "01" is attached to the second transmission device 2B (Step S21).

When the second transmission device 2B receives the probe signal, the second transmission device 2B measures, on the basis of the received probe signal, the transmission characteristic "1" between the first transmission device 2A (Step S22). Namely, this means that the second transmission device 2B acquires the transmission characteristic "1" of the first transmission device 2A. The second transmission device 2B attaches the label information "11" to the transmission characteristic of the first transmission device 2A. Furthermore, the label information "11" includes a process flag "1" indicating the completion of the transmission characteristic measurement process and includes a device number "1" of the first transmission device 2A that is the transmission end. Here, the device number at the transmission end indicates the destination of the transmission characteristic.

The second transmission device 2B transmits the transmission characteristic to which the label information "11" is attached to the third transmission device 2C (Step S23). Furthermore, if the third transmission device 2C receives the transmission characteristic, the third transmission device 2C refers to the label information "11" that is attached to the transmission characteristic and detects that the device number of the transmission end is not the same as the device number "3" of the own device. Thus, the third transmission device 2C passes the transmission characteristic and transmits the transmission characteristic to the fourth transmission device 2D (Step S24). When the fourth transmission device 2D receives the transmission characteristic, the fourth transmission device 2D refers to the label information "11" that is attached to the transmission characteristic and detects that the device number of the transmission end is not the same device number "4" of the own device. Thus, the fourth transmission device 2D passes the subject transmission characteristic and transmits the subject transmission characteristic to the first transmission device 2A (Step S25).

When the first transmission device 2A receives the transmission characteristic, the first transmission device 2A refers to the label information "11" that is attached to the transmission characteristic and detects that the device number of the transmission end is the same as the device number "1" of the own device. Thus, the first transmission device 2A extracts the transmission characteristic "1" of the own device and sets the extracted transmission characteristic "1" (Step S26). Consequently, the first transmission device 2A sets the transmission characteristic "1" that is between the second transmission device 2B and then performs, on the basis of the set transmission characteristic "1", a bit power loading process for the Tx 10. The bit power loading process is a process that determines, on the basis of the transmission characteristic, the modulation level, the allocation amount of signal power, and the like for each SC and that sets the control level of the determined modulation level and the allocation amount in the Tx 10.

After the first transmission device 2A sends the probe signal to the second transmission device 2B, the first transmission device 2A acquires the transmission characteristic between the second transmission device 2B, i.e., the transmission characteristic "1" of the own device, via the second transmission device 2B, the third transmission device 2C, and the fourth transmission device 2D.

Figure 5B:
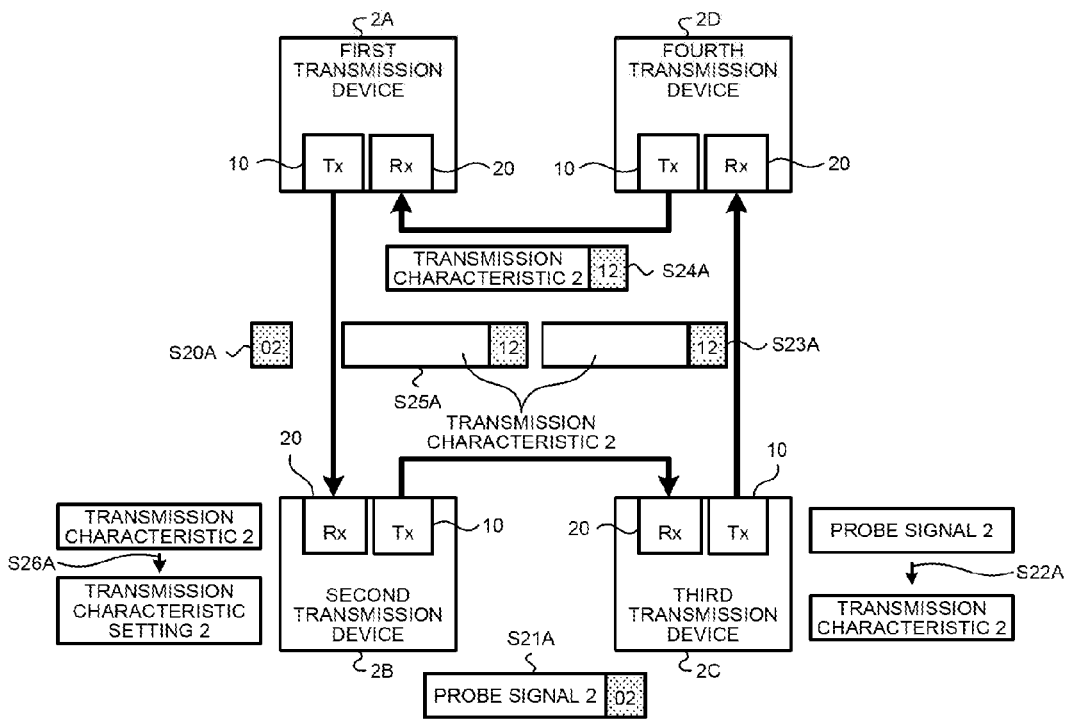
FIG. 5B is a diagram illustrating an example of the operation of a process performed when negotiation of a second transmission device is performed.

FIG. 5B is a diagram illustrating an example of the operation of a process performed when negotiation of the second transmission device 2B is performed. If the transmission characteristic of the own device is set, the first transmission device 2A transmits, to the second transmission device 2B, the label information "02" that requests the second transmission device 2B to start the transmission of the probe signal (Step S20A). Furthermore, the label information "02" indicates the process flag "0" indicating that the transmission characteristic measurement process is unprocessed and indicates the device number "2" of the second transmission device 2B that is the transmission end. When the second transmission device 2B receives the label information "02", the second transmission device 2B transmits, to the third transmission device 2C, the probe signal to which the label information "02" is attached (Step S21A).

When the third transmission device 2C receives the probe signal, the third transmission device 2C measures, on the basis of the received probe signal, the transmission characteristic "2" between the second transmission device 2B (Step S22A). Namely, this means that the third transmission device 2C acquires the transmission characteristic "2" of the second transmission device 2B. The third transmission device 2C attaches the label information "12" to the transmission characteristic. Furthermore, the label information "12" includes the process flag "1" indicating the completion of the transmission characteristic measurement process and includes the device number "2" indicating the second transmission device 2B that is the transmission end. The third transmission device 2C transmits, to the fourth transmission device 2D, the transmission characteristic to which the label information "12" is attached (Step S23A). Furthermore, if the fourth transmission device 2D receives the transmission characteristic, the fourth transmission device 2D refers to the label information "12" that is attached to the transmission characteristic and detects that the device number at the transmission end is not the same device number "4" of the own device. Thus, the fourth transmission device 2D passes the subject transmission characteristic and transmits the subject transmission characteristic to the first transmission device 2A (Step S24A).

When the first transmission device 2A receives the transmission characteristic, the first transmission device 2A refers to the label information "12" attached to the transmission characteristic and detects that the device number of the transmission end is not the same as the device number "1" of the own device. Thus, the first transmission device 2A passes the subject transmission characteristic and transmits the subject transmission characteristic to the second transmission device 2B (Step S25A). When the second transmission device 2B receives the transmission characteristic, the second transmission device 2B refers to the label information "12" attached to the transmission characteristic and detects that the device number of the transmission end is the same as the device number "2" of the own device. Thus, the second transmission device 2B extracts the transmission characteristic "2" of the own device and sets the transmission characteristic "2" (Step S26A). Consequently, the second transmission device 2B sets the transmission characteristic "2" that is between the third transmission device 2C and performs, on the basis of the set transmission characteristic "2", the bit power loading process for the Tx 10.

After the second transmission device 2B sends the probe signal to the third transmission device 2C, the second transmission device 2B acquires the transmission characteristic between the third transmission device 2C, i.e., the transmission characteristic "2" of the own device, via the third transmission device 2C, the fourth transmission device 2D, and the first transmission device 2A.

Figure 6A:
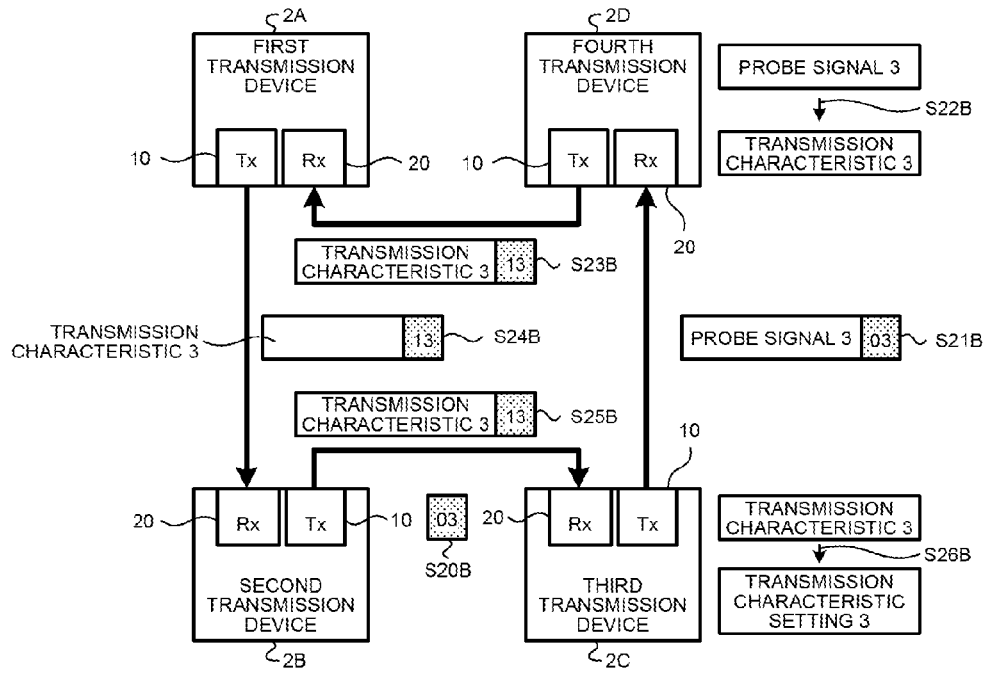
FIG. 6A is a diagram illustrating an example of the operation of a process performed when negotiation of a third transmission device is performed.

FIG. 6A is a diagram illustrating an example of the operation of a process performed when negotiation of the third transmission device 2C is performed. If the transmission characteristic of the own device is set, the second transmission device 2B transmits, to the third transmission device 2C, the label information "03" that requests the third transmission device 2C to start the transmission of the probe signal (Step S20B). The label information "03" includes the process flag "0" indicating that the transmission characteristic measurement process is unprocessed and includes the device number "3" of the third transmission device 2C that is the transmission end. When the third transmission device 2C receives the label information "03", the third transmission device 2C transmits, to the fourth transmission device 2D, the probe signal to which the label information "03" is attached (Step S21B).

When the fourth transmission device 2D receives the probe signal, the fourth transmission device 2D measures, on the basis of the received probe signal, the transmission characteristic "3" between the third transmission device 2C (Step S22B). Namely, this means that the fourth transmission device 2D acquires the transmission characteristic "3" of the third transmission device 2C. The fourth transmission device 2D attaches the label information "13" to the transmission characteristic. Furthermore, the label information "13" includes the process flag "1" indicating the completion of the transmission characteristic measurement process and includes the device number "3" of the third transmission device 2C that is the transmission end. The fourth transmission device 2D transmits, to the first transmission device 2A, the transmission characteristic to which the label information "13" is attached (Step S23B). Furthermore, when the first transmission device 2A receives the transmission characteristic, the first transmission device 2A refers to the label information "13" that is attached to the transmission characteristic and detects that the device number of the transmission end is not the same as the device number "1" of the own device. Thus, the first transmission device 2A passes the subject transmission characteristic and transmits the subject transmission characteristic to the second transmission device 2B (Step S24B).

When the second transmission device 2B receives the transmission characteristic, the second transmission device 2B refers to the label information "13" that is attached to the transmission characteristic and detects that the device number of the transmission end is not the same as the device number "2" of the own device. Thus, the second transmission device 2B passes the subject transmission characteristic and transmits the subject transmission characteristic to the third transmission device 2C (Step S25B). When the third transmission device 2C receives the transmission characteristic, the third transmission device 2C refers to the label information "13" that is attached to the transmission characteristic and detects that the device number at the transmission end is the same as the device number "3" of the own device. Thus, the third transmission device 2C extracts the transmission characteristic "3" of the own device and sets the extracted transmission characteristic "3" (Step S26B). Consequently, the third transmission device 2C sets the transmission characteristic between the fourth transmission device 2D and performs, on the basis of the set transmission characteristic "3", the bit power loading process for the Tx 10.

After the third transmission device 2C sends the probe signal to the fourth transmission device 2D, the third transmission device 2C acquires the transmission characteristic between the fourth transmission device 2D, i.e., the transmission characteristic "3" of the own device, via the fourth transmission device 2D, the first transmission device 2A, and the second transmission device 2B.

Figure 6B:
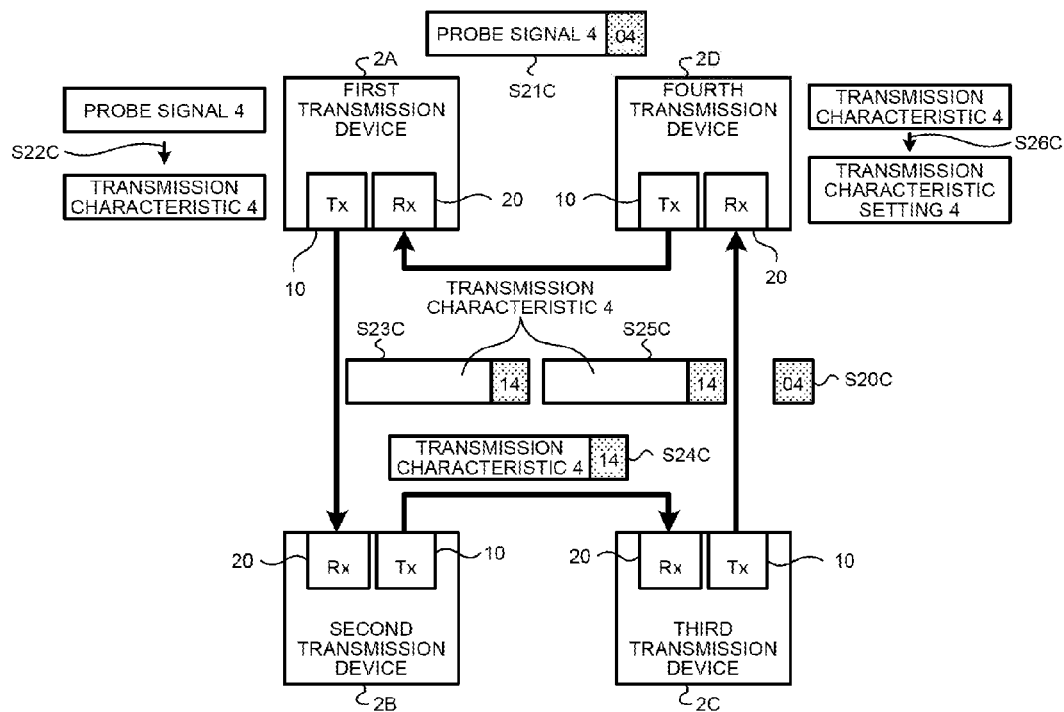
FIG. 6B is a diagram illustrating an example of the operation of a process performed when negotiation of a fourth transmission device is performed.

FIG. 6B is a diagram illustrating an example of the operation of a process performed when negotiation of the fourth transmission device 2D is performed. If the transmission characteristic of the own device is set, the third transmission device 2C transmits, to the fourth transmission device 2D, the label information "04" that requests the fourth transmission device 2D to start the transmission of the probe signal (Step S20C). Furthermore, the label information "04" includes the process flag "0" indicating that the transmission characteristic measurement process is unprocessed and includes the device number "4" of the fourth transmission device 2D that is the transmission end. When the fourth transmission device 2D receives the label information "04", the fourth transmission device 2D transmits, to the first transmission device 2A, the probe signal to which the label information "04" is attached (Step S21C).

When the first transmission device 2A receives the probe signal, the first transmission device 2A measures, on the basis of the received probe signal, the transmission characteristic "4" between the fourth transmission device 2D (Step S22C). Namely, this means that the first transmission device 2A acquires the transmission characteristic "4" of the fourth transmission device 2D. The first transmission device 2A attaches the label information "14" to the transmission characteristic. Furthermore, the label information "14" includes the process flag "1" indicating the completion of the transmission characteristic measurement process and includes the device number "4" indicating the fourth transmission device 2D that is the transmission end. The first transmission device 2A transmits, to the second transmission device 2B, the transmission characteristic to which the label information "14" is attached (Step S23C). Furthermore, when the second transmission device 2B receives the transmission characteristic, the second transmission device 2B refers to the label information "14" that is attached to the transmission characteristic and detects that the device number of the transmission end is not the same as the device number "2" of the own device. Thus, the second transmission device 2B passes the subject transmission characteristic and transmits the subject transmission characteristic to the third transmission device 2C (Step S24C).

When the third transmission device 2C receives the transmission characteristic, the third transmission device 2C refers to the label information "14" that is attached to the transmission characteristic and detects that the device number of the transmission end is not the same as the device number "3" of the own device. Thus, the third transmission device 2C passes the subject transmission characteristic and transmits the subject transmission characteristic to the fourth transmission device 2D (Step S25C). When the fourth transmission device 2D receives the transmission characteristic, the fourth transmission device 2D refers to the label information "14" that is attached to the transmission characteristic and detects that the device number of the transmission end is the same as the device number "4" of the own device. Thus, the fourth transmission device 2D extracts the transmission characteristic "4" of the own device and sets the extracted transmission characteristic "4" (Step S26C). Consequently, the fourth transmission device 2D sets the transmission characteristic of the own device and performs, on the basis of the set transmission characteristic "4", the bit power loading process for the Tx 10.

After the fourth transmission device 2D sends the probe signal to the first transmission device 2A, the fourth transmission device 2D consequently acquires the transmission characteristic between the first transmission device 2A, i.e., the transmission characteristic "4" of the own device via the first transmission device 2A, the second transmission device 2B, and the third transmission device 2C.

Figure 7:
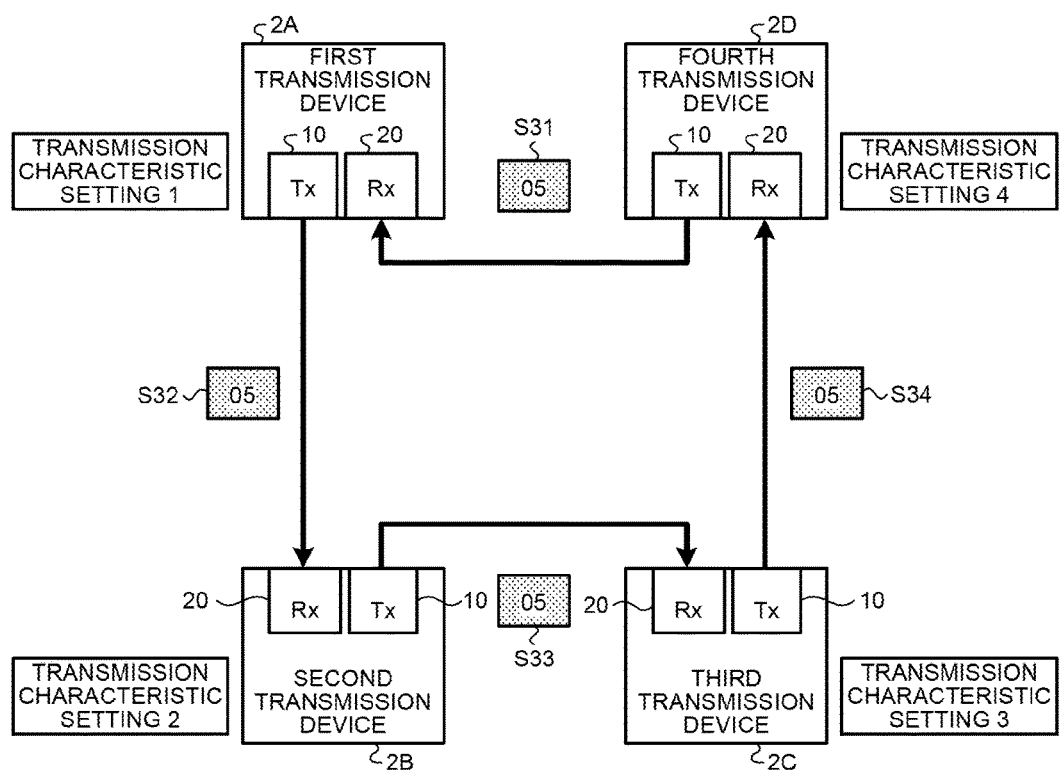
FIG. 7 is a diagram illustrating an example of the operation of a process performed when the setting of the transmission characteristic of each transmission device has been completed.

FIG. 7 is a diagram illustrating an example of the operation of a process performed when the setting of the transmission characteristic of each transmission device 2 has been completed. The fourth transmission device 2D illustrated in FIG. 7 transmits, when the setting of the transmission characteristic "4" of the own device has been completed, the fourth transmission device 2D transmits the label information "05" to the first transmission device 2A in order to request the transmission device 2 provided immediately downstream to start the transmission of the probe signal (Step S31). Furthermore, the label information "05" is the device number "5" that identifies the process flag "0" and the transmission device at the transmission end.

When the first transmission device 2A receives the label information "05", the first transmission device 2A refers to the label information "05" and detects that the device number of the transmission end exceeds the total number of devices. Thus, the first transmission device 2A passes the subject label information, transmits the label information to the second transmission device 2B, and ends the negotiation operation (Step S32). Furthermore, the total number of devices, i.e., the total number of the transmission devices 2 accommodated in the ring network is "4" in a case illustrated in, for example, FIG. 7. The total number of devices is acquired from the NMS 3.

When the second transmission device 2B receives the label information "05", the second transmission device 2B refers to the label information "05" and detects that the device number of the transmission end exceeds the total number of devices. Thus, the second transmission device 2B passes the subject label information, transmits the label information to the third transmission device 2C, and ends the negotiation operation (Step S33). When the third transmission device 2C receives the label information "05", the third transmission device 2C refers to the label information "05" detects that the device number of the transmission end exceeds the total number of devices. Thus, the third transmission device 2C passes the subject label information, transmits the label information to the fourth transmission device 2D, and ends the negotiation operation (Step S34). When the fourth transmission device 2D receives the label information "05", the fourth transmission device 2D refers to the label information "05" and detects that the device number of the transmission end exceeds the total number of devices. Consequently, the fourth transmission device 2D ends the negotiation operation.

Figure 8:
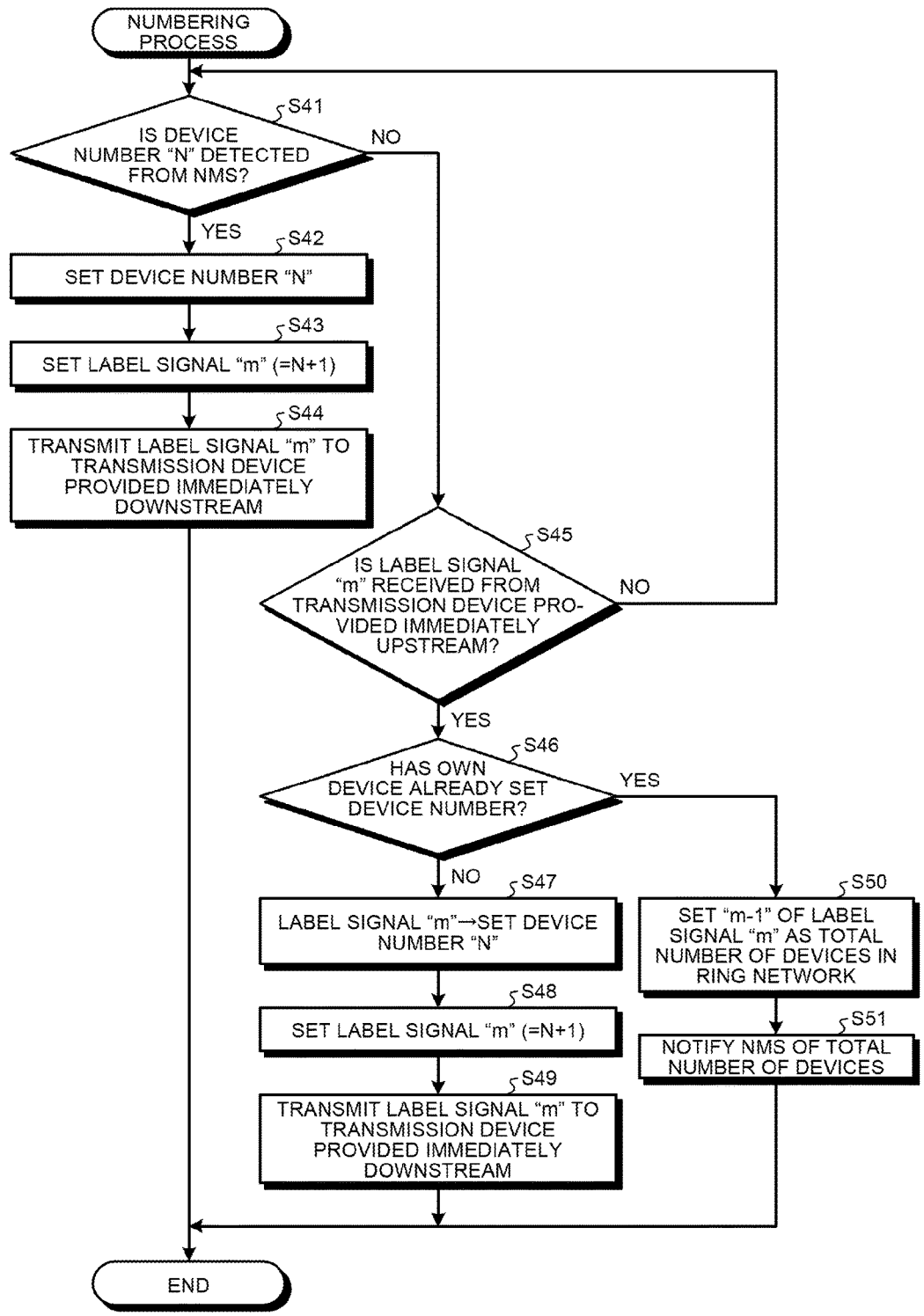
FIG. 8 is a flowchart illustrating the operation of a process related to a numbering process performed by the transmission device.

FIG. 8 is a flowchart illustrating the operation of a process related to a numbering process performed by the transmission device 2. The numbering process illustrated in FIG. 8 is the process of attaching the device number to each of the transmission devices 2 in the ring network, as illustrated in FIG. 4.

In FIG. 8, the transmission device 2 determines whether the device number "N" is detected from the NMS 3 (Step S41). If the transmission device 2 detects the device number "N" from the NMS 3 (Yes at Step S41), the transmission device 2 sets the device number "N" of the own device (Step S42). After having setting the device number "N", the transmission device 2 sets "m" that is obtained by incrementing the device number "N" by 1 to the label signal (Step S43). The transmission device 2 transmits the set label signal "m" to the transmission device 2 provided immediately downstream (Step S44) and ends the operation of the process illustrated in FIG. 8.

If the transmission device 2 does not detects the device number "N" (No at Step S41), the transmission device 2 determines whether the label signal "m" is received from the transmission device 2 provided immediately upstream (Step S45). If the transmission device 2 receives the label signal "m" (Yes at Step S45), the transmission device 2 determines whether the own device has already set the device number (Step S46).

If the own device has not set to the device number (No at Step S46), the transmission device 2 sets the label signal "m" to the device number "N" (Step S47) and sets "m" that is obtained by incrementing the device number "N" by 1 to the label signal (Step S48). Furthermore, the transmission device 2 transmits the set label signal to the transmission device 2 provided immediately downstream (Step S49) and ends the operation of the process illustrated in FIG. 8. If the transmission device 2 does not receive the label signal "m" from the transmission device 2 provided immediately upstream (No at Step S45), the transmission device 2 moves to Step S41 in order to determine the device number "N" is detected from the NMS 3.

If the own device has already been set to the device number (Yes at Step S46), the transmission device 2 sets the number obtained by decrementing the label signal "m" by 1 as the total number of the transmission devices 2 in the ring network (Step S50) and notifies the NMS 3 of the total number of devices (Step S51). Then, the transmission device 2 ends the operation of the process illustrated in FIG. 8.

The transmission device 2 that performs the numbering process illustrated in FIG. 8 increments the device number of the own device by 1 and transmits the label signal to the transmission device 2 provided immediately downstream. The transmission device 2 provided immediately downstream sets the device number of the own device on the basis of the received label signal. Consequently, the optical transmission system 1 can set the device number of the own device by transferring the label signal to each of the transmission devices 2 in the ring network.

When the transmission device 2 receives the label signal from the transmission device 2 provided immediately upstream in the ring network and set, if the device number of the own device has not been set, the transmission device 2 sets the received label signal to the device number. Consequently, the transmission device 2 can set the device number of the own device.

When the transmission device 2 sets the received label signal to the device number, the transmission device 2 transmits, to the transmission device 2 provided immediately downstream, the label signal with a value obtained by incrementing the device number of the own device by 1. Consequently, the transmission device 2 can transmit the label signal to the transmission device 2 provided immediately downstream.

When the transmission device 2 receives the label signal from the transmission device 2 provided immediately upstream, if the device number of the own device has already been set, the transmission device 2 sets to a value obtained by decrementing the number represented by the received label signal by 1 to the total number of devices and notifies the NMS 3 of the total number of the devices. Consequently, the NMS 3 can recognize the total number of the transmission devices 2 in the ring network.

Figure 9:
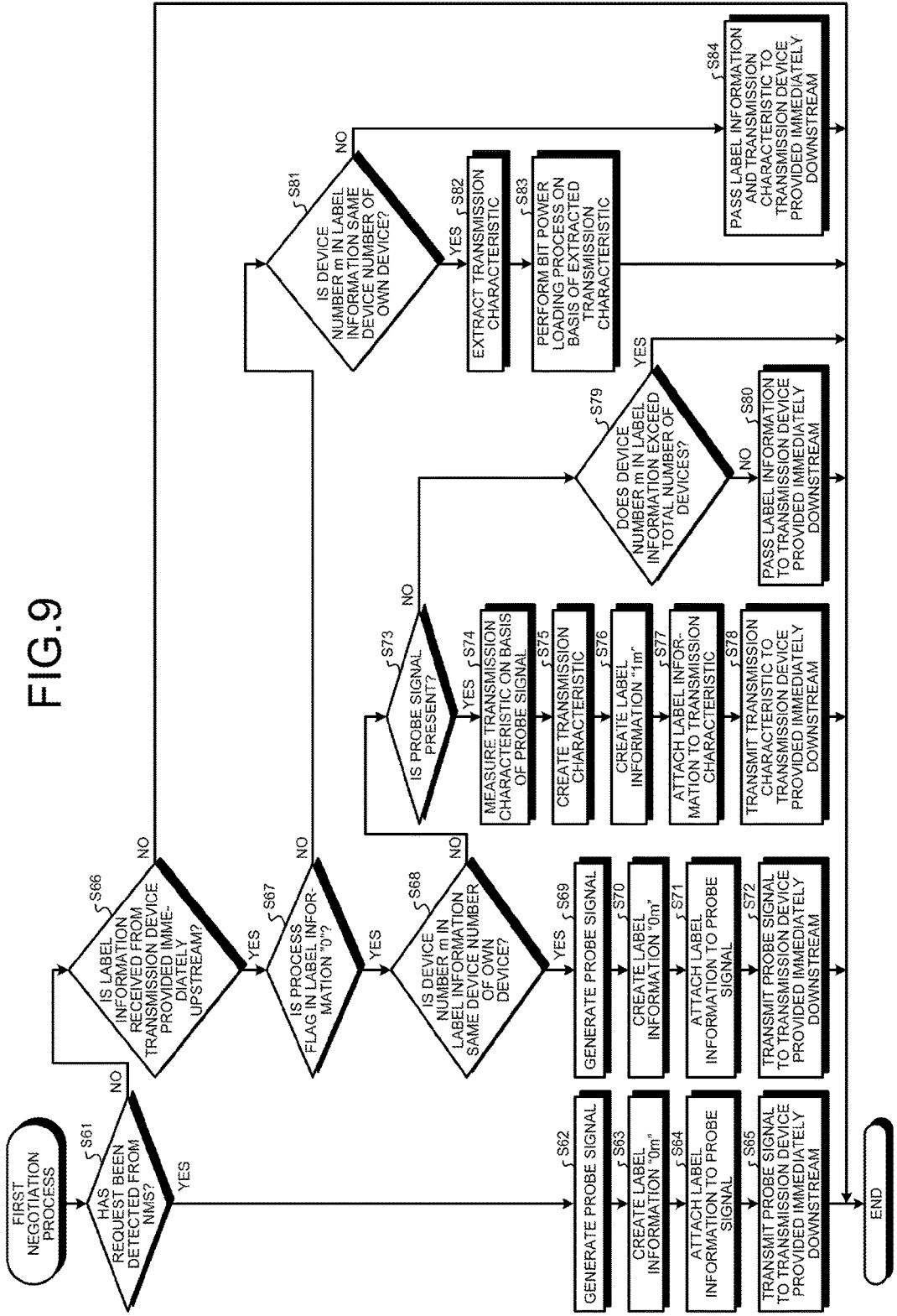
FIG. 9 is a flowchart illustrating the operation of a process related to a first negotiation process performed by a control unit in the transmission device.

FIG. 9 is a flowchart illustrating the operation of a process related to a first negotiation process performed by a control unit in the transmission device 2. The first negotiation process illustrated in FIG. 9 is a process, as illustrated in FIGS. 5A, 5B, 6A, 6B, and 7, that set the transmission characteristic for each of the transmission devices 2 in the ring network.

In FIG. 9, the requesting unit 31 in the control unit 30 in the transmission device 2 determines whether a request to start negotiation has been detected from the NMS 3 (Step S61). When the requesting unit 31 detects a request to start the negotiation (Yes at Step S61), the requesting unit 31 generates a probe signal (Step S62). The label control unit 32 in the control unit 30 creates label information "$0m$" (Step S63). The label control unit 32 attaches the label information "$0m$" to the probe signal in the attaching unit 16 (Step S64), transmits the probe signal to which the label information "$0m$" is attached to the transmission device 2 provided immediately downstream (Step S65), and ends the operation of the process illustrated in FIG. 9.

If the control unit 30 does not detect a request to start the negotiation from the NMS 3 (No at Step S61), the control unit 30 determines whether the label information is received from the transmission device 2 provided immediately upstream (Step S66). If the control unit 30 receives the label information from the transmission device 2 provided immediately upstream (Yes at Step S66), the control unit 30 determines, via the reading unit 26, whether the process flag in the label information is "0" (Step S67). If the process flag in the label information is "0" (Yes at Step S67), the control unit 30 determines that the transmission characteristic measurement process based on the probe signal is unprocessed and determines whether the device number m in the label information is the same device number of the own device (Step S68).

If the device number m in the label information is the same device number of the own device (Yes at Step S68), the control unit 30 generates a probe signal (Step S69) and creates the label information "$0m$" (Step S70). Furthermore, it is assumed that, for the device number of the label information, the device number m of the own device is attached. The label control unit 32 attaches, at the attaching unit 16, the label information to the probe signal (Step S71), transmits the probe signal to which the label information is attached to the transmission device 2 provided immediately downstream (Step S72), and ends the operation of the process illustrated in FIG. 9.

If the device number in the label information is not the same as the device number of the own device (No at Step S68), the control unit 30 determines whether the probe signal is present in the label information received from the transmission device 2 provided immediately upstream (Step S73). If the probe signal is present in the label information received from the transmission device 2 provided immediately upstream (Yes at Step S73), the measuring unit 33 in the control unit 30 measures the transmission characteristic between the transmission device 2 provided immediately upstream on the basis of the probe signal (Step S74). When the measuring unit 33 measures the transmission characteristic between the transmission device 2 provided immediately upstream, the measuring unit 33 creates the transmission characteristic (Step S75) and creates label information "$1m$" (Step S76). Furthermore, the label information determines that the transmission characteristic measurement process has been completed, sets the process flag to "1", and sets the device number m of the transmission device 2 at the transmission end in the probe signal related to the transmission characteristic.

The label control unit 32 attaches, at the attaching unit 16, the label information "$1m$" to the transmission characteristic (Step S77), transmits the transmission characteristic to which the label information is attached to the transmission device 2 provided immediately downstream (Step S78), and ends the operation of the process illustrated in FIG. 9. If the probe signal is not present (No at Step S73), the control unit 30 determines whether the device number m in the label information exceeds the total number of devices (Step S79). If the device number m in the label information does not exceed the total number of devices (No at Step S79), the switch control unit 37 in the control unit 30 passes and transmits the label information to the transmission device 2 provided immediately downstream (Step S80), and ends the operation of the process illustrated in FIG. 9. If the device number m in the label information exceeds the total number of devices (Yes at Step S79), the control unit 30 ends the operation of the process illustrated in FIG. 9.

If the process flag in the label information received from the transmission device 2 provided immediately upstream is not "0" (No at Step S67), the control unit 30 determines that the process flag is "1" and determines that the transmission characteristic is attached to the label information. Then, the determination unit 34 in the control unit 30 determines whether the device number m in the label information is the same as the device number of the own device (Step S81).

If the device number m in the label information is the same as the device number of the own device (Yes at Step S81), the acquiring unit 35 in the control unit 30 extracts the transmission characteristic to which the received label information is attached (Step S82). Furthermore, the acquiring unit 35 extracts the transmission characteristic by switching the first switch 42 and connecting on the control unit 30 via the switch control unit 37. The setting unit 36 in the control unit 30 performs the bit power loading process on the basis of the extracted transmission characteristic (Step S83) and ends the operation of the process illustrated in FIG. 9.

If the device number m in the label information is not the same as the device number of the own device (No at Step S81), the switch control unit 37 passes and transmits the received label information and the transmission characteristic to the transmission device 2 provided immediately downstream (Step S84) and ends the operation of the process illustrated in FIG. 9. If the control unit 30 does not receive the label information from the transmission device 2 provided immediately upstream (No at Step S66), the control unit 30 ends the operation of the process illustrated in FIG. 9.

The transmission device 2 that performs a first transmission characteristic setting process illustrated in FIG. 9 receives the label information from the transmission device 2 provided immediately upstream; attaches, if the process flag in the label information is "0" and the device number in the label information is the own device number, the label information of the device number of the own device to the probe signal; and transmits the probe signal to the transmission device 2 provided immediately downstream. Consequently, by referring to the label information, the transmission device 2 can determine whether a probe signal is generated.

When the transmission device 2 receives the label information from the transmission device 2 provided immediately upstream, if the process flag in the label information is "0", if the device number in the label information is not the same as that of the own device, and if the probe signal is present, the transmission device 2 measures, on the basis of the probe signal, the transmission characteristic between the transmission device 2 provided immediately upstream. Consequently, by referring to the label information, the transmission device 2 can determine whether the transmission characteristic is measured.

When the transmission device 2 receives the label information from the transmission device 2 provided immediately upstream, if the process flag in the label information is "0", if the device number in the label information is not the same as that of the own device, and if the probe signal is not present, the transmission device 2 determines whether the device number in the label information exceeds the total number of devices. Then, if the device number in the label information does not exceed the total number of devices, the transmission device 2 passes the label information and transmits the label information to the transmission device 2 provided immediately downstream. Consequently, the transmission device 2 can reduce the processing load, such as demodulation of the label information unneeded for the own device.

When the transmission device 2 receives the label information from the transmission device 2 provided immediately upstream, if the process flag in the label information is "1" and if the device number in the label information is the same as that of the own device, the transmission device 2 extracts the transmission characteristic of the own device and determines, on the basis of the extracted transmission characteristic, the modulation level and the allocation amount of signal power for each SC. Consequently, the transmission device 2 refers to the label information and performs the bit power loading process on the basis of the transmission characteristic of the own device.

When the transmission device 2 receives the label information from the transmission device 2 provided immediately upstream, if the process flag in the label information is "1" and if the device number in the label information is not the same as that of the own device, the transmission device 2 passes and transmits the label information and the transmission characteristic to the transmission device 2 provided immediately downstream. Consequently, the transmission device 2 can reduce the processing load, such as demodulation of the label information and the transmission characteristic unneeded for the own device.

When the transmission device 2 according to the first embodiment acquires, from the transmission device 2 provided immediately upstream by rounding the ring network, the transmission characteristic of the own device measured by the transmission device 2 provided on the immediately downstream side, the transmission device 2 performs the bit power loading process on the basis of the acquired transmission characteristic. Consequently, even in the ring network, negotiation between the transmission devices can be ensured. Furthermore, because the negotiation can be ensured, even if the characteristics of the devices or the optical transmission lines 4 are degraded, the occurrence of transmission error thereof can be efficiently suppressed.

When the transmission device 2 receives the probe signal from the transmission device 2 provided immediately upstream, the transmission device 2 measures the transmission characteristic on the basis of the subject probe signal and attaches the device number of the transmission device 2 at the transmission end in the probe signal to the subject transmission characteristic. Furthermore, the transmission device 2 transmits, to the transmission device 2 provided immediately downstream, the transmission characteristic to which the device number is attached in order to send, by rounding the ring network, the transmission characteristic to the transmission device 2 at the transmission end. Consequently, the transmission device 2 can specify the transmission characteristic of the own device by referring to the device number.

Furthermore, in the first embodiment, the probe signal is transmitted to the transmission device 2 provided immediately downstream for each of the transmission devices 2; the transmission characteristic between the transmission device 2 at the transmission end is measured by the transmission device 2 provided immediately downstream; and the measured transmission characteristic is transmitted to the transmission device 2 at the transmission end by rounding the ring network. Consequently, the number of rounds in the ring network from when the single transmission device 2 starts the transmission of the probe signal until when the transmission device 2 sets the transmission characteristic is one. Namely, for example, if the total number of the transmission devices 2 in the ring network is four, the number of rounds in the ring network until the transmission characteristic of all of the transmission devices 2 is four. Accordingly, as a second embodiment, an embodiment of the optical transmission system 1 that can reduce the number of rounds in the ring network needed until the transmission characteristic is set will be described below. Furthermore, by assigning the same reference numerals to the components having the same configurations as those in the optical transmission system 1 according to the first embodiment, descriptions of the overlapped configurations and the operations thereof will be omitted.

[b] Second Embodiment

Figure 10:
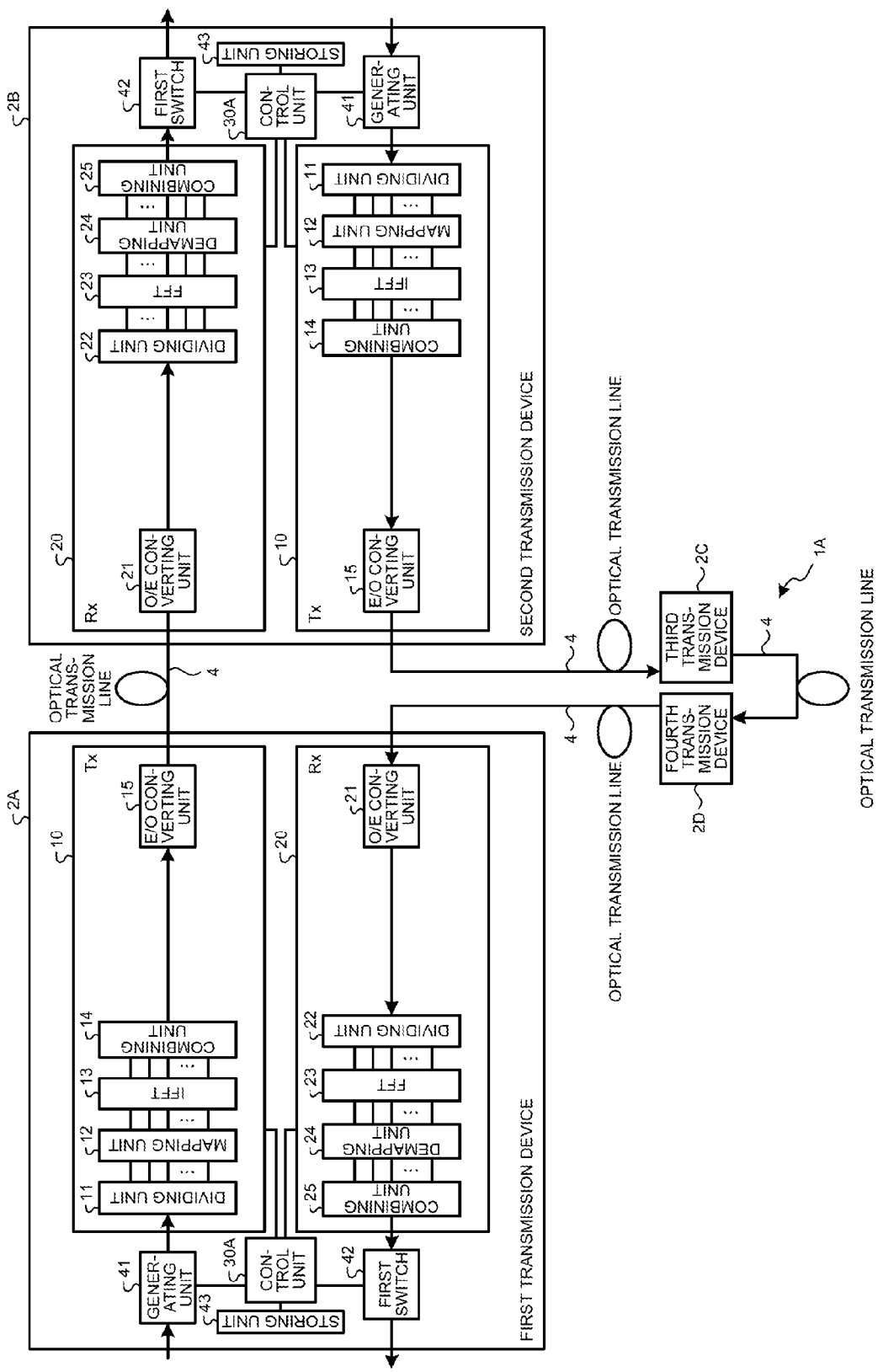
FIG. 10 is a diagram illustrating an example of a transmission device in an optical transmission system according to a second embodiment.

FIG. 10 is a diagram illustrating an example of the transmission device 2 in an optical transmission system 1A according to a second embodiment. The transmission device 2 illustrated in FIG. 10 differs from the transmission device 2 illustrated in FIG. 2 in that the attaching unit 16 and the second switch 17 are deleted from the Tx 10 and the reading unit 26 and the third switch 27 are deleted from the Rx 20.

Each of the transmission devices 2 in the ring network transmits the probe signal to the transmission device 2 provided immediately downstream at a first timing. Furthermore, the first timing is the timing at which, for example, a request to start negotiation is detected from the NMS 3. When the transmission device 2 provided immediately downstream receives the probe signal sent from the transmission device 2 provided immediately upstream, the transmission device 2 measures the transmission characteristic between the transmission device 2 at the transmission end and ends the measured transmission characteristic in the storing unit 43.

Furthermore, after the transmission device 2 stores the transmission characteristic of the transmission device 2 at the transmission end, the transmission device 2 transmits the transmission characteristic that is being stored at a second timing to the transmission device 2 provided immediately downstream, sequentially concatenates the transmission characteristic of each of the transmission devices 2 and sequentially transmits the transmission characteristics to each of the transmission devices 2 at the transmission ends. Furthermore, the second timing is the timing at which, for example, sufficient predetermined time has elapsed from when transmission of the probe signal is started until when the measurement process of the transmission characteristic has been completed. Then, each of the transmission devices 2 at the transmission end extracts the transmission characteristic of the own device from the concatenated transmission characteristics and performs the bit power loading process on the basis of the extracted transmission characteristic of the own device.

Figure 11:
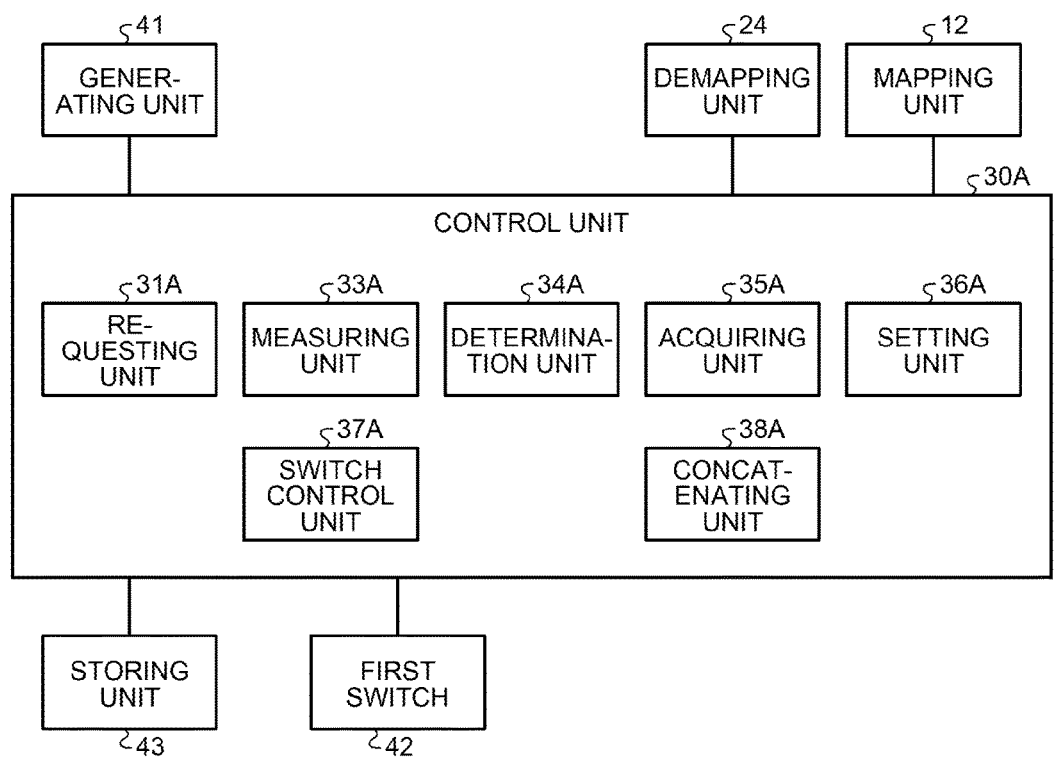
FIG. 11 is a diagram illustrating an example of the functional configuration of a control unit.

FIG. 11 is a diagram illustrating an example of the functional configuration of a control unit 30A. The control unit 30A illustrated in FIG. 11 includes a requesting unit 31A, a measuring unit 33A, a determination unit 34A, an acquiring unit 35A, a setting unit 36A, a switch control unit 37A, and a concatenating unit 38A. The requesting unit 31A requests the generating unit 41 to generate a probe signal. The measuring unit 33A measures, on the basis of the probe signal sent from the transmission device 2 provided immediately upstream, the transmission characteristic between the transmission device 2 provided immediately upstream and stores the measured transmission characteristic in the storing unit 43. The determination unit 34A determines, on the basis of a predetermined concatenation order, whether the transmission characteristic of the own device is present in the received transmission characteristic. The acquiring unit 35A acquires, on the basis of the predetermined concatenation order, the transmission characteristic of the own device from a plurality of the concatenated transmission characteristics. The setting unit 36A determines, on the basis of the acquired transmission characteristic of the own device, the modulation level and the allocation amount of signal power for each SC and sets the determined modulation level and the allocation amount of signal power for each SC in the Tx 10. The switch control unit 37A switches and controls the first switch 42. The concatenating unit 38A concatenates each of the transmission characteristics of the transmission devices 2 in the ring network in the predetermined concatenation order. The storing unit 43 includes, in addition to the area that stores therein the device numbers, an area that stores therein the measurement characteristic measured in the measuring unit 33 and an area that stores therein transmission flags.

Figure 12:
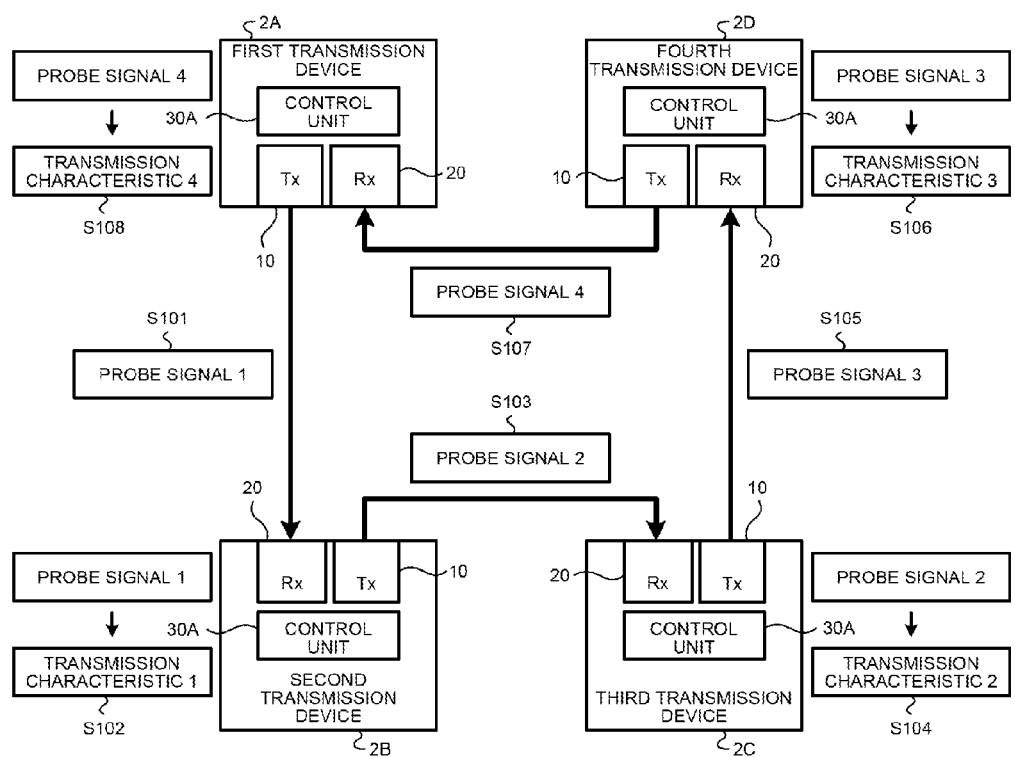
FIG. 12 is a diagram illustrating an example of the operation of a process related to a second negotiation process performed in the optical transmission system.
Figure 13A:
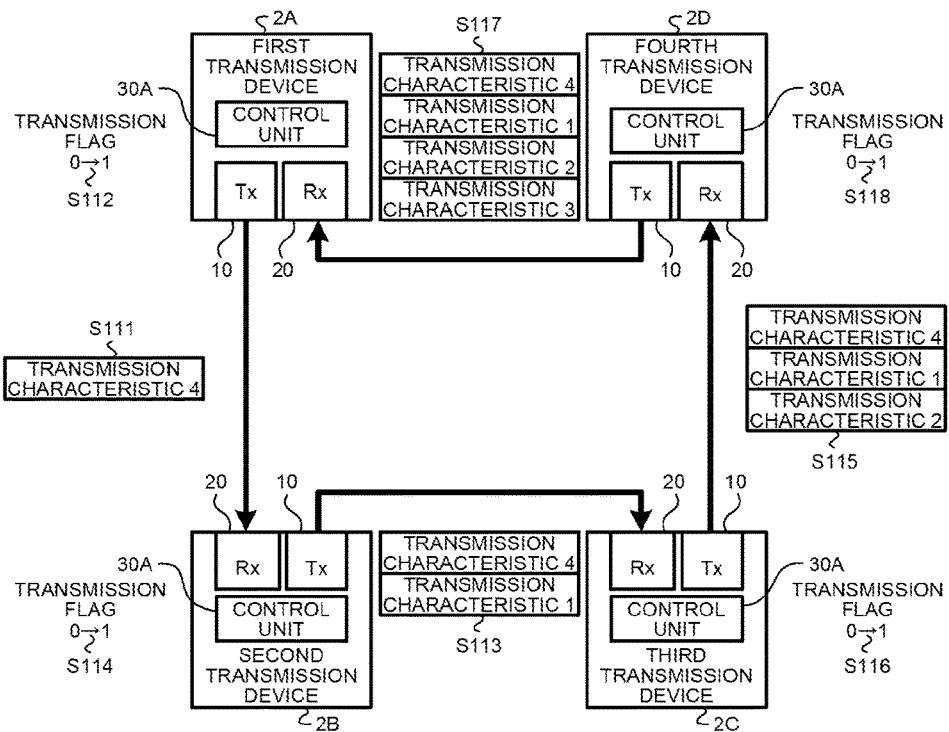
FIG. 13A is a diagram illustrating an example of the operation of a process related to the second negotiation process performed in the optical transmission system.
Figure 13B:
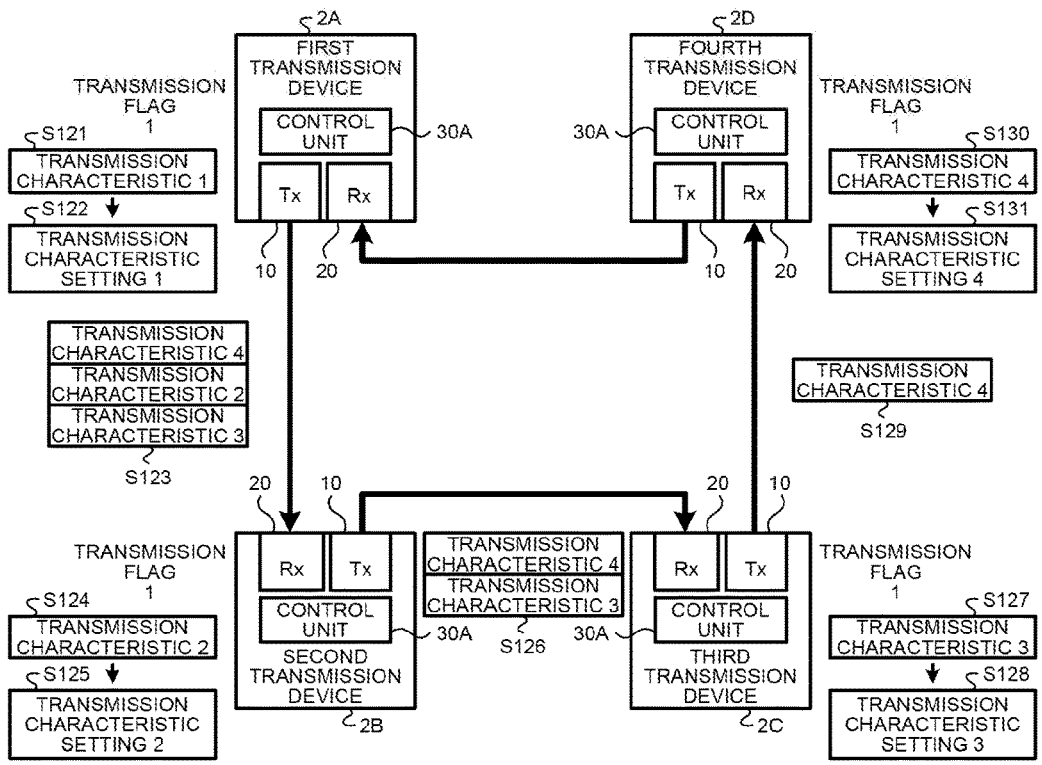
FIG. 13B is a diagram illustrating an example of the operation of a process related to the second negotiation process performed in the optical transmission system.

In the following, the operation of the optical transmission system 1A according to the second embodiment will be described. FIGS. 12, 13A, and 13B are diagrams each illustrating an example of the operation of a process related to a second negotiation process performed in the optical transmission system. When the first transmission device 2A illustrated in FIG. 12 detects the first timing at which, for example, a request to start negotiation is detected from the NMS 3, the first transmission device 2A transmits the probe signal to the second transmission device 2B provided immediately downstream (Step S101). When the second transmission device 2B receives the probe signal sent from the first transmission device 2A, the second transmission device 2B measures, on the basis of the probe signal, the transmission characteristic "1" between the first transmission device 2A (Step S102). Then, the second transmission device 2B stores the transmission characteristic "1" of the first transmission device 2A in the storing unit 43.

When the second transmission device 2B detects the request to start the negotiation from the NMS 3, the second transmission device 2B transmits the probe signal to the third transmission device 2C provided immediately downstream (Step S103). When the third transmission device 2C receives the probe signal sent from the second transmission device 2B, the third transmission device 2C measures, on the basis of the probe signal, the transmission characteristic "2" between the second transmission device 2B (Step S104). Then, the third transmission device 2C stores the transmission characteristic "2" of the second transmission device 2B in the storing unit 43.

When the third transmission device 2C detects the request to start the negotiation from the NMS 3, the third transmission device 2C transmits the probe signal to the fourth transmission device 2D provided immediately downstream (Step S105). When the fourth transmission device 2D receives the probe signal sent from the third transmission device 2C, the fourth transmission device 2D measures, on the basis of the probe signal, the transmission characteristic "3" between the third transmission device 2C (Step S106). Then, the fourth transmission device 2D stores the transmission characteristic "3" of the third transmission device 2C in the storing unit 43.

When the fourth transmission device 2D detects the request to start the negotiation from the NMS 3, the fourth transmission device 2D transmits the probe signal to the first transmission device 2A provided immediately downstream (Step S107). When the first transmission device 2A receives the probe signal sent from the fourth transmission device 2D, the first transmission device 2A measures, on the basis of the probe signal, the transmission characteristic "4" between the fourth transmission device 2D (Step S108). Then, the first transmission device 2A stores the transmission characteristic "4" of the fourth transmission device 2D in the storing unit 43.

When the first transmission device 2A illustrated in FIG. 13A detects the second timing, the first transmission device 2A transmits the transmission characteristic "4" of the fourth transmission device 2D that is being stored in the storing unit 43 to the second transmission device 2B (Step S111). Furthermore, the second timing is the timing at which, for example, sufficient predetermined time has elapsed from when transmission of the probe signal is started until when the measurement process of the transmission characteristic has been completed. Then, the first transmission device 2A sets the transmission flag to "1" (Step S112).

When the second transmission device 2B receives the transmission characteristic of the fourth transmission device 2D, the second transmission device 2B concatenates the transmission characteristic "1" of the first transmission device 2A that is being stored in the storing unit 43 with the transmission characteristic "4" of the fourth transmission device 2D at the end of the transmission characteristic "4" and then transmits the concatenated transmission characteristic to the third transmission device 2C (Step S113). Accordingly, the concatenated transmission characteristics are concatenated in the order the transmission characteristic "4" of the fourth transmission device 2D and the transmission characteristic "1" of the first transmission device 2A. Then, the second transmission device 2B sets the transmission flag to "1" (Step S114). When the third transmission device 2C receives the transmission characteristics from the second transmission device 2B, the third transmission device 2C concatenates the transmission characteristic "2" of the second transmission device 2B that is being stored in the storing unit 43 with the transmission characteristic "1" of the first transmission device 2A at the end of the transmission characteristic "1" and transmits the concatenated transmission characteristics to the fourth transmission device 2D (Step S115). Accordingly, the concatenated transmission characteristics are concatenated in the order the transmission characteristic "4" of the fourth transmission device 2D, the transmission characteristic "1" of the first transmission device 2A, and the transmission characteristic "2" of the second transmission device 2B. Then, the third transmission device 2C sets the transmission flag to "1" (Step S116).

When the fourth transmission device 2D receives the transmission characteristics from the third transmission device 2C, the fourth transmission device 2D concatenates the transmission characteristic "3" of the third transmission device 2C stored in the storing unit 43 with the transmission characteristic "2" of the second transmission device 2B at the end of the transmission characteristic "2" and transmits the concatenated transmission characteristics to the first transmission device 2A (Step S117). Accordingly, the concatenated transmission characteristics are concatenated in the order the transmission characteristic "4" of the fourth transmission device 2D, the transmission characteristic "1" of the first transmission device 2A, the transmission characteristic "2" of the second transmission device 2B, and the transmission characteristic "3" of the third transmission device 2C. Then, the fourth transmission device 2D sets the transmission flag to "1" (Step S118).

Each of the transmission devices 2 can transfer the transmission characteristic, which is being stored in the storing unit 43, of the transmission device 2 provided immediately upstream to the transmission device 2 provided immediately downstream, concatenate the transmission characteristic of each of the transmission devices 2 in the predetermined concatenation order, and transmit the transmission characteristics of all of the transmission devices 2 in the ring network in one round.

When the first transmission device 2A illustrated in FIG. 13B receives the concatenated transmission characteristics from the fourth transmission device 2D in the state in which the transmission flag is "1", the first transmission device 2A extracts the transmission characteristic "1" of the own device from the transmission characteristics on the basis of the concatenation order (Step S121). Furthermore, for example, if four transmission characteristics are concatenated, the concatenation order of the transmission characteristic "1" of the first transmission device 2A is the second transmission characteristic. The first transmission device 2A sets the extracted transmission characteristic "1" of the own device (Step S122) and transmits the remaining transmission characteristics to the second transmission device 2B (Step S123). When the second transmission device 2B receives the concatenated transmission characteristics from the first transmission device 2A in the state in which the transmission flag is "1", the second transmission device 2B extracts the transmission characteristic "2" of the own device from the transmission characteristics on the basis of the concatenation order (Step S124). Furthermore, for example, if four transmission characteristics are concatenated, the concatenation order of the transmission characteristic "2" of the second transmission device 2B is the third transmission characteristic. The second transmission device 2B sets the extracted transmission characteristic "2" of the own device (Step S125) and transmits the remaining transmission characteristics to the third transmission device 2C (Step S126).

When the third transmission device 2C receives the transmission characteristics from the second transmission device 2B in the state in which the transmission flag is "1", the third transmission device 2C extracts the transmission characteristic "3" of the own device from the transmission characteristics on the basis of the concatenation order (Step S127). Furthermore, for example, if four transmission characteristics are concatenated, the concatenation order of the transmission characteristic "3" of the third transmission device 2C is the fourth transmission characteristic. The third transmission device 2C sets the extracted transmission characteristic "3" of the own device (Step S128) and transmits the remaining transmission characteristics to the fourth transmission device 2D (Step S129). When the fourth transmission device 2D receives the transmission characteristics from the third transmission device 2C in the state in which the transmission flag is "1", the fourth transmission device 2D extracts the transmission characteristic "4" of the own device from the transmission characteristics on the basis of the concatenation order (Step S130). Furthermore, for example, if four transmission characteristics are concatenated, the concatenation order of the transmission characteristic "4" of the fourth transmission device 2D is the first transmission characteristic. The fourth transmission device 2D sets the extracted transmission characteristic "4" of the own device (Step S131) and ends the operation of the process illustrated in FIG. 13B.

Because each of the transmission devices 2 concatenates the transmission characteristic of each of the transmission devices 2 in the predetermined concatenation order, each of the transmission devices 2 extracts, on the basis of the predetermined concatenation order, the transmission characteristic of the own device from the concatenated transmission characteristics and sets the extracted transmission characteristic. Consequently, the transmission device 2 can extract the transmission characteristic of the own device even without the device number.

Figure 14:
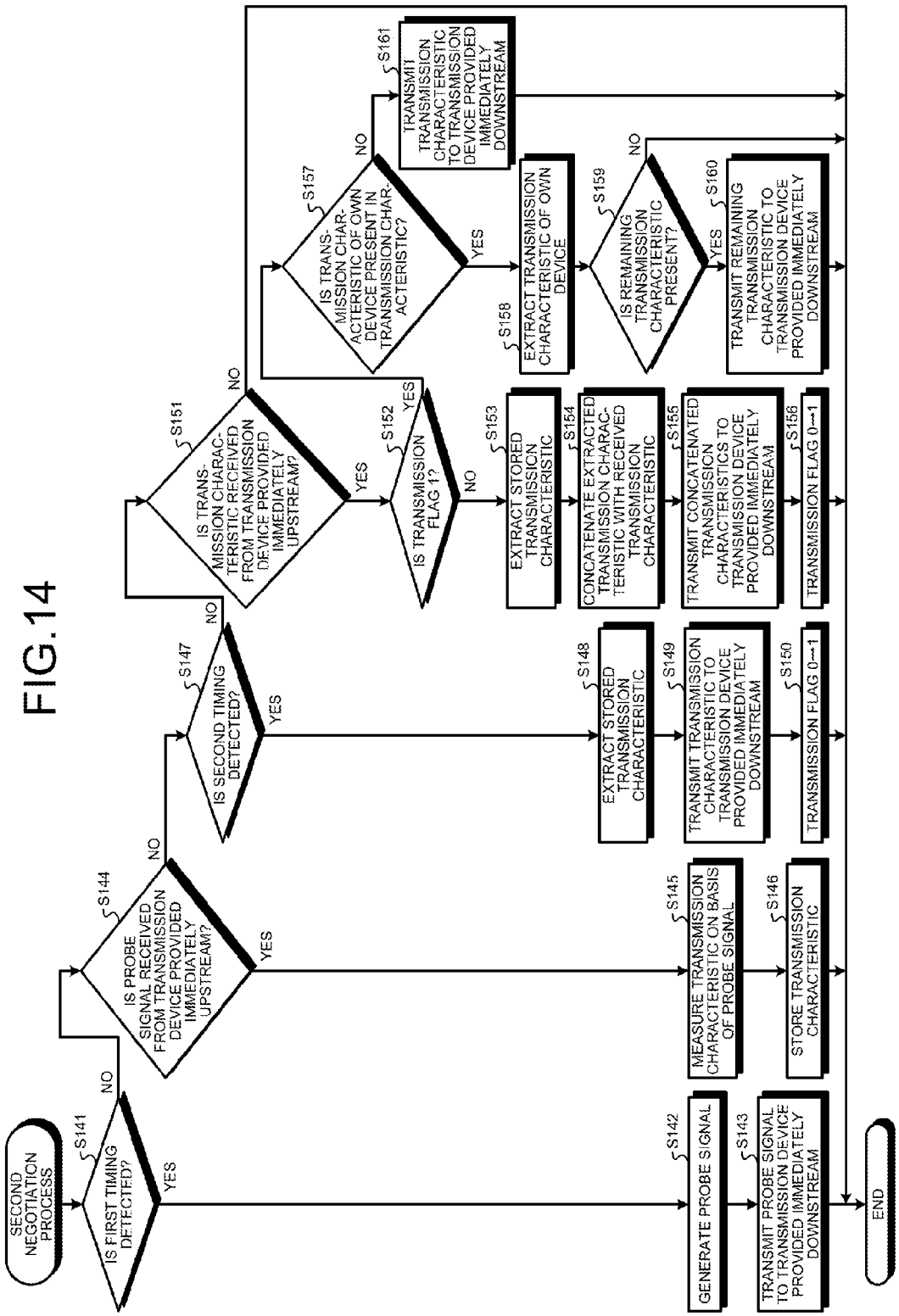
FIG. 14 is a flowchart illustrating an example of the operation of a process related to the second negotiation process performed by the control unit in the transmission device.

FIG. 14 is a flowchart illustrating an example of the operation of a process related to a second negotiation process performed by the control unit 30A in the transmission device 2. The second negotiation process illustrated in FIG. 14 is the process, as illustrated in FIGS. 12, 13A, and 13B, of setting the transmission characteristics of each of the transmission devices 2 in the ring network.

In FIG. 14, the requesting unit 31A in the control unit 30A in each of the transmission devices 2 determines whether the first timing is detected (Step S141). Furthermore, the first timing is the timing at which, for example, a request to start negotiation is detected from the NMS 3. When the requesting unit 31A detects the first timing (Yes at Step S141), the requesting unit 31A generates a probe signal (Step S142), transmits the probe signal to the transmission device 2 provided immediately downstream (Step S143), and ends the operation of the process illustrated in FIG. 14.

If the measuring unit 33A in the control unit 30A does not detect the first timing (No at Step S141), the measuring unit 33A determines whether the probe signal is received from the transmission device 2 provided immediately upstream (Step S144). When the measuring unit 33A receives the probe signal from the transmission device 2 provided immediately upstream (Yes at Step S144), the measuring unit 33A measures the transmission characteristic between the transmission device 2 provided immediately upstream on the basis of the probe signal (Step S145). Then, the measuring unit 33A stores the transmission characteristic of the transmission device 2 provided immediately upstream in the storing unit 43 (Step S146) and ends the operation of the process illustrated in FIG. 14.

If the control unit 30A does not receive the probe signal from the transmission device 2 provided immediately upstream (No at Step S144), the control unit 30A determines whether the second timing is detected (Step S147). The second timing is the timing at which, for example, sufficient predetermined time has elapsed from when transmission of the probe signal is started until when the measurement process of the transmission characteristic has been completed in the transmission device 2 provided on the immediately downstream side. When the concatenating unit 38A in the control unit 30A detects the second timing (Yes at Step S147), the concatenating unit 38A extracts the transmission characteristic that is being stored in the storing unit 43 (Step S148). The concatenating unit 38A transmits the extracted transmission characteristic to the transmission device 2 provided immediately downstream (Step S149), sets the transmission flag to "1" in order to indicate that the transmission of the transmission characteristic has been completed (Step S150), and ends the operation of a process illustrated in FIG. 14.

If the concatenating unit 38A does not detect the second timing (No at Step S147), the concatenating unit 38A determines whether the transmission characteristic is received from the transmission device 2 provided immediately upstream (Step S151). If the concatenating unit 38A receives the transmission characteristic from the transmission device 2 provided immediately upstream (Yes at Step S151), the concatenating unit 38A determines whether the transmission flag is "1" (Step S152). If the transmission flag is not "1" (No at Step S152), the concatenating unit 38A determines that the transmission flag is "0", i.e., the transmission characteristic has not been transmitted. Then, the concatenating unit 38A extracts the transmission characteristic that is being stored in the storing unit 43 (Step S153) and concatenates the extracted transmission characteristic with the transmission characteristic at the end of the transmission characteristic (Step S154). Furthermore, each of the transmission devices 2 concatenates the transmission characteristic addressed to the transmission device 2 at the transmission end in the predetermined concatenation order. The transmission device 2 transmits the concatenated transmission characteristics to the transmission device 2 provided immediately downstream (Step S155), sets the transmission flag to "1" (Step S156), and ends the operation of the process illustrated in FIG. 14.

If the transmission flag is "1" (Yes at Step S152), the determination unit 34A in the control unit 30A determines whether the transmission characteristic of the own device is present in the received transmission characteristic (Step S157). If the transmission characteristic of the own device is present in the received transmission characteristic (Yes at Step S157), the acquiring unit 35A in the control unit 30A extracts the transmission characteristic of the own device (Step S158). After the control unit 30A extracts the transmission characteristic of the own device, the control unit 30A determines whether the remaining transmission characteristic is present in the received transmission characteristic (Step S159). If the remaining transmission characteristic is present (Yes at Step S159), the control unit 30A transmits the remaining transmission characteristic to the transmission device 2 provided immediately downstream (Step S160) and ends the operation of the process illustrated in FIG. 14.

If the remaining transmission characteristic is not present (No at Step S159), the control unit 30A ends the operation of the process illustrated in FIG. 14. If the transmission characteristic of the own device is not present in the received transmission characteristic (No at Step S157), the control unit 30A transmits the received transmission characteristic to the transmission device 2 provided immediately downstream (Step S161) and ends the operation of the process illustrated in FIG. 14. Furthermore, if the control unit 30A does not receive the transmission characteristic from the transmission device 2 provided immediately upstream (No at Step S151), the control unit 30A ends the operation of the process illustrated in FIG. 14.

Each of the transmission devices 2 that performs the second negotiation process illustrated in FIG. 14 transmits the probe signal to the transmission device 2 provided immediately downstream at the first timing. The transmission device 2 provided immediately downstream receives the probe signal sent from the transmission device 2 provided immediately upstream; measures the transmission characteristic on the basis of the received probe signal; and stores the measured transmission characteristic in the storing unit 43. Furthermore, the transmission device 2 transmits, at the second timing, transmission characteristic that is being stored in the storing unit 43 to the transmission device 2 provided immediately downstream. When the transmission device 2 provided immediately downstream receives the transmission characteristic from the transmission device 2 provided immediately upstream, the transmission device 2 provided immediately downstream concatenates the stored transmission characteristic in the predetermined concatenation order, for example, at the end of the received transmission characteristic, and transmits the concatenated transmission characteristics to the transmission device 2 provided immediately downstream. Then, if the transmission characteristic that is being stored in the storing unit 43 is present, each of the transmission devices 2 sequentially concatenates the subject transmission characteristic with the received transmission characteristic and sequentially transmits the concatenated transmission characteristics to the transmission device 2 provided immediately downstream. Consequently, in the optical transmission system 1A, it is possible to transmit the transmission characteristics of all of the transmission devices 2 in the ring network to each of the transmission devices 2 at the transmission end in one round.

When the transmission device 2 receives the concatenated transmission characteristics from the transmission device 2 provided immediately upstream, the transmission device 2 extracts, on the basis of the predetermined concatenate order, the transmission characteristic of the own device from the concatenated transmission characteristics. Consequently, the transmission device 2 can extract the transmission characteristic of the own device even without the device number.

The transmission device 2 determines, on the basis of the extracted transmission characteristic, the modulation level and the allocation amount of signal power for each SC and sets the determined modulation level and the allocation amount. Consequently, the transmission device 2 can ensure stable DMT transmission between the transmission device 2 provided immediately downstream.

Each of the transmission devices 2 according to the second embodiment transmits the probe signal to the transmission device 2 provided immediately downstream. Furthermore, each of the transmission devices 2 provided immediately downstream measures the transmission characteristic on the basis of the received probe signal and stores the subject transmission characteristic in the storing unit 43. Furthermore, each of the transmission devices 2 concatenates the transmission characteristic that is being stored in the storing unit 43 in each of the transmission devices 2 in the predetermined concatenation order and transmits the concatenated transmission characteristics to each of the transmission devices 2 at the transmission end. Consequently, the optical transmission system 1A can transmit the transmission characteristics of all of the transmission devices 2 in the ring network to all of the transmission devices 2 at the transmission end in one round.

When each of the transmission devices 2 receives the transmission characteristic from the transmission device 2 provided immediately upstream, each of the transmission devices 2 extracts the transmission characteristic of the own device from the concatenated transmission characteristics on the basis of the predetermined concatenation order. Consequently, the transmission device 2 can acquire the transmission characteristic of the own device from the concatenated transmission characteristics in one round even without the device number.

In the optical transmission system 1 according to the first embodiment, if the number of devices in the ring network is four, the number of rounds needed to set the transmission characteristics of the devices is four. In contrast, in the optical transmission system 1A according to the second embodiment, the number of rounds needed to set the transmission characteristics of the devices can be reduced to one. Consequently, communication occupation needed for negotiation in the ring network can be reduced. Furthermore, the effect thereof is large as the number of the transmission devices 2 is increased.

Furthermore, in the second embodiment, the concatenation order is set in the order the fourth transmission device 2D→the first transmission device 2A→the second transmission device 2B→the third transmission device 2C. Then, the transmission characteristics are concatenated in the order the transmission characteristic "4" of the fourth transmission device 2D, transmission characteristic "1" of the first transmission device 2A, the transmission characteristic "2" of the second transmission device 2B, and the transmission characteristic "3" of the third transmission device 2C. However, the concatenation order is not limited to this but may appropriately be changed.

In the second embodiment, the transmission characteristic of the own device is extracted from the transmission characteristics of all of the transmission devices 2 on the basis of the concatenation order; however, instead of the concatenation order, for example, a device number may be attached to the transmission characteristic and the transmission characteristic of the own device may also be extracted from the concatenated transmission characteristics on the basis of the device number. Accordingly, an embodiment of this case will be described below as a third embodiment. Furthermore, by assigning the same reference numerals to the components having the same configurations as those in the optical transmission system 1A according to the second embodiment, descriptions of the overlapped configurations and the operations thereof will be omitted.

[c] Third Embodiment

Figure 15:
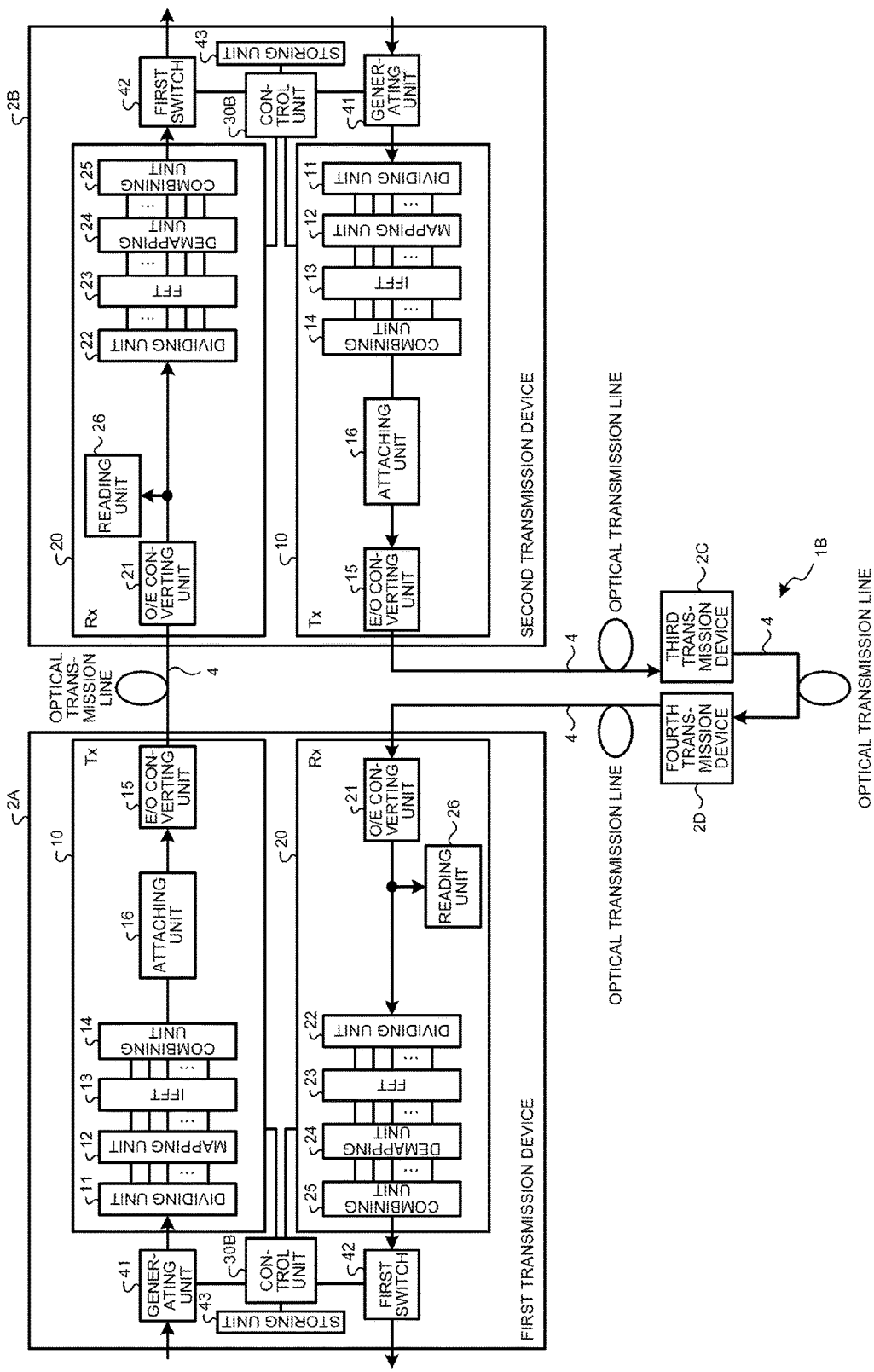
FIG. 15 is a diagram illustrating an example of a transmission device in an optical transmission system according to a third embodiment.

FIG. 15 is a diagram illustrating an example of the transmission device 2 in an optical transmission system 1B according to a third embodiment. The transmission device 2 illustrated in FIG. 15 differs from the transmission device 2 illustrated in FIG. 2 in that the second switch 17 is deleted from the Tx 10 and the third switch 27 are deleted from the Rx 20.

Each of the transmission devices 2 in the ring network transmits the probe signal to the transmission device 2 provided immediately downstream at the first timing. Furthermore, when each of the transmission devices 2 provided immediately downstream receives the probe signal from the transmission device (transmission device at the transmission end) 2 provided immediately upstream, each of the transmission devices 2 measures the transmission characteristic between the transmission device 2 at the transmission end and stores the measured transmission characteristic in the storing unit 43.

Furthermore, after the transmission device 2 stores the transmission characteristic of the transmission device 2 at the transmission end, the transmission device 2 attaches the device number of the transmission device 2 at the transmission end to the transmission characteristic that is being stored in the second timing and transmits the attached transmission characteristic to the transmission device 2 provided immediately downstream. Furthermore, when the transmission device 2 receives the transmission characteristic of the transmission device 2 provided immediately upstream, the transmission device 2 attaches the device number of the transmission end to the transmission characteristic that is being stored in the storing unit 43 and sequentially concatenates the subject transmission characteristic with the received transmission characteristic. The transmission device 2 sequentially concatenates the transmission characteristic of each of the transmission devices 2 and then transmits the concatenated transmission characteristics to each of the transmission device 2 at the transmission end by rounding the ring network. Then, the transmission device 2 at each of the transmission end extracts, on the basis of the device number, the transmission characteristic of the own device from the concatenated transmission characteristics and performs the bit power loading process on the basis of the extracted transmission characteristic of the own device.

Figure 16:
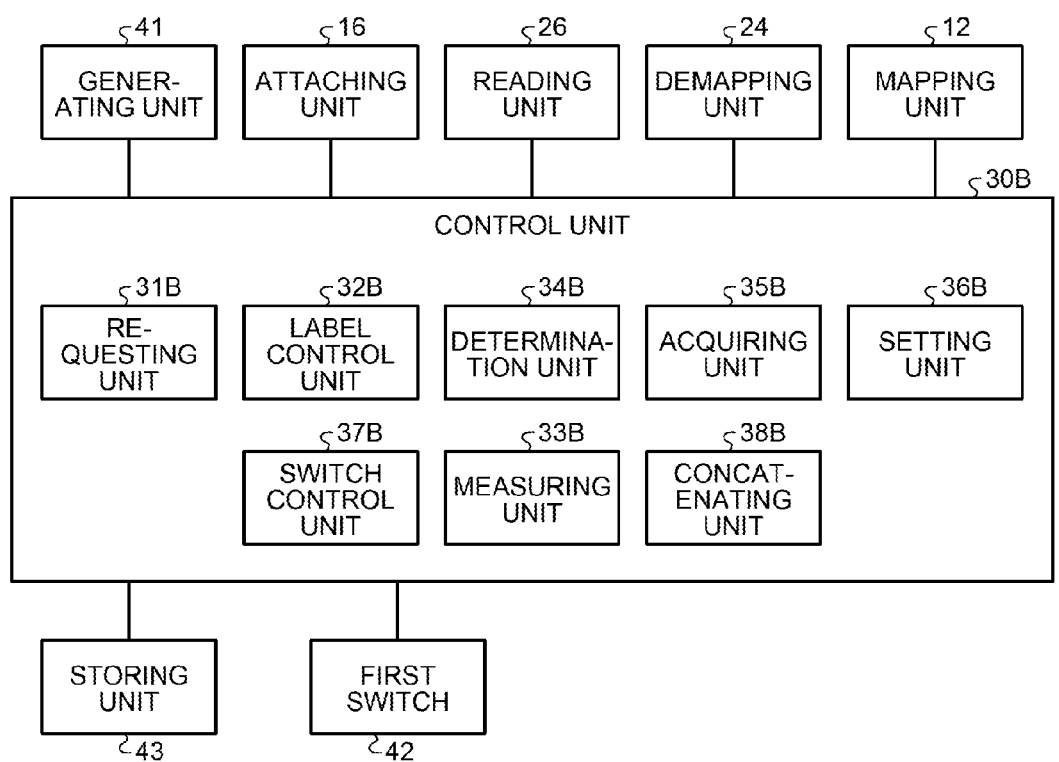
FIG. 16 is a diagram illustrating an example of the functional configuration of a control unit.

FIG. 16 is a diagram illustrating an example of the functional configuration of a control unit 30B. The control unit 30B illustrated in FIG. 16 includes a requesting unit 31B, a label control unit 32B, a measuring unit 33B, a determination unit 34B, an acquiring unit 35B, a setting unit 36B, a switch control unit 37B, and a concatenating unit 38B. The requesting unit 31B requests the generating unit 41 to generate the probe signal. The label control unit 32B controls the attaching unit 16 that attaches the device number and controls the reading unit 26 that reads the device number. The measuring unit 33B measures the transmission characteristic between the transmission device 2 provided immediately upstream on the basis of the probe signal sent from the transmission device 2 provided immediately upstream and stores the measured transmission characteristic in the storing unit 43. The determination unit 34B determines, on the basis of the device number, whether the transmission characteristic of the own device is present in the received transmission characteristic. The acquiring unit 35B acquires, on the basis of the device number, the transmission characteristic of the own device from the plurality of concatenated transmission characteristics. The setting unit 36B decides, on the basis of the acquired transmission characteristic of the own device, the modulation level and the allocation amount of signal power for each SC and sets the decided modulation level and the allocation amount of signal power for each SC in the Tx 10. The switch control unit 37B switches and controls the first switch 42. The concatenating unit 38B sequentially concatenates the transmission characteristic of each of the transmission devices 2 in the ring network. The storing unit 43 includes, in addition to the area that stores therein the device numbers, an area that stores therein the measurement characteristics measured by the measuring unit 33 and an area that stores therein the transmission flags.

Figure 17:
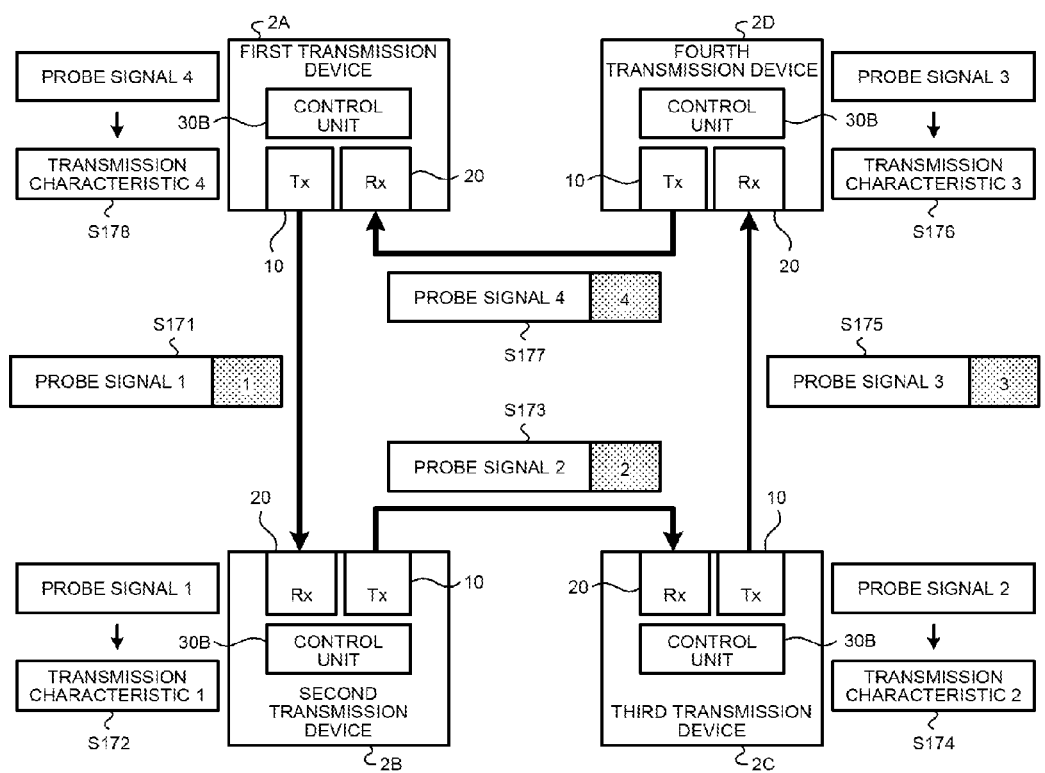
FIG. 17 is a diagram illustrating an example of the operation of a process related to a third negotiation process performed in the optical transmission system.
Figure 18A:
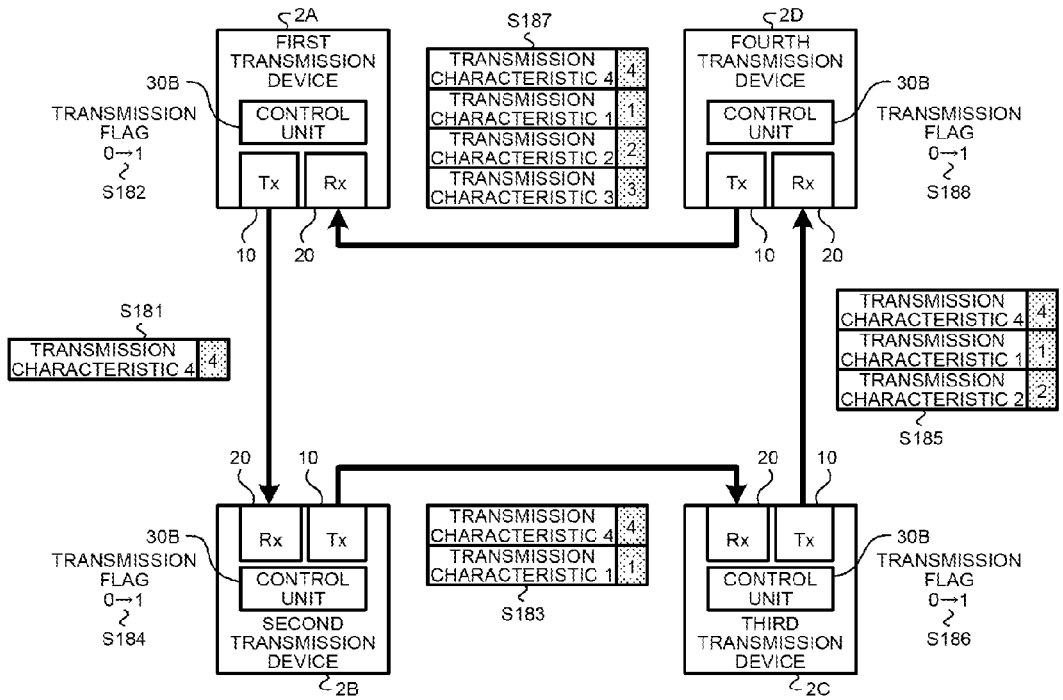
FIG. 18A is a diagram illustrating an example of the operation of a process related to a third negotiation process performed in the optical transmission system.
Figure 18B:
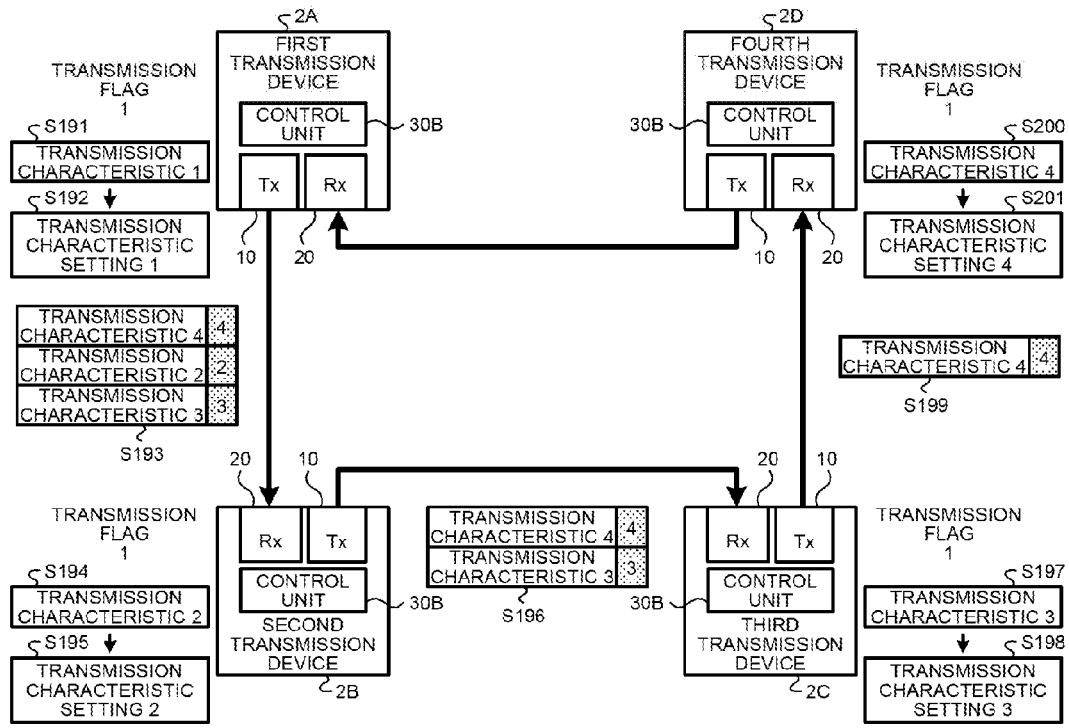
FIG. 18B is a diagram illustrating an example of the operation of a process related to the third negotiation process performed in the optical transmission system.

In the following, the operation of the optical transmission system 1B according to the third embodiment will be described. FIGS. 17, 18A, and 18B are diagrams each illustrating an example of the operation of a process related to a third negotiation process performed in the optical transmission system 1B. When the first transmission device 2A illustrated in FIG. 17 detects the first timing, for example, the timing at which a request to start negotiation is detected from the NMS 3, the first transmission device 2A transmits the probe signal to which the device number "1" of the own device is attached to the second transmission device 2B provided immediately downstream (Step S171). When the second transmission device 2B receives the probe signal from the first transmission device 2A, the second transmission device 2B measures, on the basis of the probe signal, the transmission characteristic "1" between the first transmission device 2A (Step S172). Then, the second transmission device 2B stores the transmission characteristic "1" of the first transmission device 2A in the storing unit 43.

When the second transmission device 2B detects the request to start the negotiation from the NMS 3, the second transmission device 2B transmits the probe signal to which the device number "2" of the own device is attached to the third transmission device 2C provided immediately downstream (Step S173). When the third transmission device 2C receives the probe signal sent from the second transmission device 2B, the third transmission device 2C measures, on the basis of the probe signal, the transmission characteristic "2" between the second transmission device 2B (Step S174). Then, the third transmission device 2C stores the transmission characteristic "2" of the second transmission device 2B in the storing unit 43.

When the third transmission device 2C detects the request to start the negotiation from the NMS 3, the third transmission device 2C transmits the probe signal to which the device number "3" of the own device is attached to the fourth transmission device 2D provided immediately downstream (Step S175). When the fourth transmission device 2D receives the probe signal sent from the third transmission device 2C, the fourth transmission device 2D measures, on the basis of the probe signal, the transmission characteristic "3" between the third transmission device 2C (Step S176). Then, the fourth transmission device 2D stores the transmission characteristic "3" of the third transmission device 2C in the storing unit 43.

When the fourth transmission device 2D detects the request to start the negotiation from the NMS 3, the fourth transmission device 2D transmits probe signal to which the device number "4" of the own device is attached to the first transmission device 2A provided immediately downstream (Step S177). When the first transmission device 2A receives the probe signal sent from the fourth transmission device 2D, the first transmission device 2A measures, on the basis of the probe signal, the transmission characteristic "4" between the fourth transmission device 2D (Step S178). Then, the first transmission device 2A stores the transmission characteristic "4" of the fourth transmission device 2D in the storing unit 43.

The first transmission device 2A illustrated in FIG. 18A attaches, at the second timing, the device number "4" of the fourth transmission device 2D that is the transmission end to the transmission characteristic "4" that is being stored in the storing unit 43 and transmits the transmission characteristic to which the device number "4" is attached to the second transmission device 2B (Step S181). Furthermore, the second timing is the timing at which, for example, sufficient predetermined time has elapsed from when transmission of the probe signal is started until when the measurement of the transmission characteristic has been completed. Then, the first transmission device 2A sets the transmission flag that is used to identify the completion of transmission of the transmission characteristic to "1" (Step S182).

When the second transmission device 2B receives the transmission characteristic "4" from the first transmission device 2A, the second transmission device 2B attaches the device number "1" of the first transmission device 2A at the transmission end to the transmission characteristic "1" that is being stored in the storing unit 43. Furthermore, the second transmission device 2B concatenates the transmission characteristic "1" of the device number "1" with the transmission characteristic "4" of the device number "4" that is received from the first transmission device 2A and then transmits the concatenated transmission characteristics to the third transmission device 2C (Step S183). Thus, the concatenated transmission characteristics are the transmission characteristic "4" of the device number "4" and transmission characteristic "1" of the device number "1". Then, the second transmission device 2B sets the transmission flag to "1" (Step S184).

When the third transmission device 2C receives the transmission characteristic from the second transmission device 2B, the third transmission device 2C attaches the device number "2" of the second transmission device 2B at the transmission end to the transmission characteristic "2" that is being stored in the storing unit 43. Furthermore, the third transmission device 2C concatenates the transmission characteristic "2" of the device number "2" with the transmission characteristic that is received from the second transmission device 2B and then transmits the concatenated transmission characteristics to the fourth transmission device 2D (Step S185). Thus, the concatenated transmission characteristics are the transmission characteristic "4" of the device number "4", the transmission characteristic "1" of the device number "1", and the transmission characteristic "2" of the device number "2". Then, the third transmission device 2C sets the transmission flag to "1" (Step S186).

When the fourth transmission device 2D receives the transmission characteristic from the third transmission device 2C, the fourth transmission device 2D attaches the device number "3" of the third transmission device 2C at the transmission end to the transmission characteristic "3" that is stored in the storing unit 43. Furthermore, the fourth transmission device 2D concatenates the transmission characteristic "3" of the device number "3" to the transmission characteristic received from the third transmission device 2C and transmits the concatenated transmission characteristics to the first transmission device 2A (Step S187). Thus, the concatenated transmission characteristics are the transmission characteristic "4" of the device number "4", the transmission characteristic "1" of the device number "1", the transmission characteristic "2" of the device number "2", and the transmission characteristic "3" of the device number "3". Then, the fourth transmission device 2D sets the transmission flag to "1" (Step S188) and ends the operation of the process illustrated in FIG. 18A.

Each of the transmission devices 2 can attaches the device number at the transmission end to the transmission characteristic that is being stored in the storing unit 43, sequentially concatenate the transmission characteristic of each of the transmission devices 2, and transmit the transmission characteristics of all of the transmission devices 2 in the ring network in one round.

When the first transmission device 2A illustrated in FIG. 18B receives the concatenated transmission characteristics from the fourth transmission device 2D in the state in which the transmission flag is "1", the first transmission device 2A extracts the transmission characteristic "1" of the own device from the transmission characteristic on the basis of the device number "1" of the own device (Step S191). The first transmission device 2A sets the extracted transmission characteristic "1" of the own device (Step S192) and transmits the remaining transmission characteristics to the second transmission device 2B (Step S193).

When the second transmission device 2B receives the concatenated transmission characteristics from the first transmission device 2A in the state in which the transmission flag is "1", the second transmission device 2B extracts the transmission characteristic "2" of the own device from the transmission characteristic on the basis of the device number "2" of the own device (Step S194). The second transmission device 2B sets the extracted transmission characteristic "2" of the own device (Step S195) and transmits the remaining transmission characteristic to the third transmission device 2C (Step S196).

When the third transmission device 2C receives the concatenated transmission characteristics from the second transmission device 2B in the state in which the transmission flag is "1", the third transmission device 2C extracts the transmission characteristic "3" of the own device from the transmission characteristic on the basis of the device number "3" of the own device (Step S197). The third transmission device 2C sets the extracted transmission characteristic "3" of the own device (Step S198) and transmits the remaining transmission characteristic to the fourth transmission device 2D (Step S199).

When the fourth transmission device 2D receives the concatenated transmission characteristics from the third transmission device 2C in the state in which the transmission flag is "1", the fourth transmission device 2D extracts the transmission characteristic "4" of the own device from the transmission characteristic on the basis of the device number "4" of the own device (Step S200). The fourth transmission device 2D sets the extracted transmission characteristic "4" of the own device (Step S201) and ends the operation of the process illustrated in FIG. 18B.

Because each of the transmission devices 2 sequentially the transmission characteristic to which the device number of each of the transmission devices 2 is attached and sequentially transmits the transmission characteristics of all of the transmission devices 2 to the transmission device 2 at each of the transmission end, the transmission devices 2 extracts the transmission characteristic of the own device from the concatenated transmission characteristics on the basis of the device number and sets the extracted transmission characteristic. Consequently, the transmission device 2 can extract the transmission characteristic of the own device even without the predetermined concatenation order.

FIG. 19 is a flowchart illustrating an example of the operation of a process related to the third negotiation process performed in the control unit 30B in the transmission device 2. The third negotiation process illustrated in FIG. 19 is a process, as illustrated in FIGS. 17, 18A, and 18B, of setting the transmission characteristic of each of the transmission devices 2 in the ring network.

In FIG. 19, the requesting unit 31B in the control unit 30B in each of the transmission devices 2 determines whether the first timing is detected (Step S211). When the requesting unit 31B detects the first timing (Yes at Step S211), the requesting unit 31B generates the probe signal (Step S212) and the device number of the own device is attached to the probe signal by the attaching unit 16 (Step S213). The control unit 30B transmits the probe signal to which the device number of the own device is attached to the transmission device 2 provided immediately downstream (Step S214) and ends the operation of the process illustrated in FIG. 19.

If the measuring unit 33B in the control unit 30B does not detect the first timing (No at Step S211), the measuring unit 33B determines whether the probe signal is received from the transmission device 2 provided immediately upstream (Step S215). If the measuring unit 33B receives the probe signal from the transmission device 2 provided immediately upstream (Yes at Step S215), the measuring unit 33B measures the transmission characteristic between the transmission device 2 provided immediately upstream on the basis of the probe signal (Step S216). Then, the measuring unit 33B stores the transmission characteristic of the transmission device 2 provided immediately upstream in the storing unit 43 (Step S217) and ends the operation of the process illustrated in FIG. 19.

If the control unit 30B receives the probe signal from the transmission device 2 provided immediately upstream (No at Step S215), the control unit 30B determines whether the second timing is detected (Step S218). Furthermore, the second timing is the timing at which, for example, sufficient predetermined time has elapsed from when transmission of the probe signal is started until when the measurement process of the transmission characteristic has been completed on the transmission device 2 side provided immediately downstream. If the concatenating unit 38B in the control unit 30B detects the second timing (Yes at Step S218), the concatenating unit 38B extracts the transmission characteristic that is stored in the storing unit 43 (Step S219). The concatenating unit 38B attaches the device number of the transmission device 2 provided immediately upstream to the extracted transmission characteristic (Step S220) and transmits the attached transmission characteristic to the transmission device 2 provided immediately downstream (Step S221). Then, the concatenating unit 38B sets the transmission flag to "1" in order to indicate the completion of the transmission of the transmission characteristic (Step S222) and ends the operation of the process illustrated in FIG. 19.

If the concatenating unit 38B does not detect the second timing (No at Step S218), the concatenating unit 38B determines whether the transmission characteristic is received from the transmission device 2 provided immediately upstream (Step S223). When the concatenating unit 38B receives the transmission characteristic from the transmission device 2 provided immediately upstream (Yes at Step S223), the concatenating unit 38B determines whether the transmission flag is "1" (Step S224). If the transmission flag is not "1" (No at Step S224), the concatenating unit 38B determines that the transmission flag is "0", i.e., determines that the transmission characteristic has not been transmitted.

Then, the concatenating unit 38B extracts the transmission characteristic that is being stored in the storing unit 43 (Step S225) and the device number of the transmission end is attached to the extracted transmission characteristic by the attaching unit 16 (Step S226). The transmission device 2 concatenates the transmission characteristic to which the device number is attached with the received transmission characteristic (Step S227). The transmission device 2 transmits the concatenated transmission characteristics to the transmission device 2 provided immediately downstream (Step S228), sets the transmission flag to "1" (Step S229), and ends the operation of the process illustrated in FIG. 19.

If the transmission flag is "1" (Yes at Step S224), the determination unit 34B in the control unit 30B determines whether the transmission characteristic of the own device is present in the received transmission characteristic on the basis of the device number of the own device (Step S230). If the transmission characteristic of the own device is present in the received transmission characteristic (Yes at Step S230), the acquiring unit 35B in the control unit 30B extracts the transmission characteristic of the own device (Step S231). After the control unit 30B extracts the transmission characteristic of the own device, the control unit 30B determines whether the device number that has not been extracted is present in the received transmission characteristic (Step S232). If the device number that has not been extracted is present (Yes at Step S232), the control unit 30B transmits the remaining transmission characteristics to the transmission device 2 provided immediately downstream (Step S233) and ends the operation of the process illustrated in FIG. 19.

If the device number that has not been extracted is not present (No at Step S232), the control unit 30B ends the operation of a process illustrated in FIG. 19. If the transmission characteristic of the own device is not present in the received transmission characteristic (No at Step S230), the control unit 30B transmits the received transmission characteristic to the transmission device 2 provided immediately downstream (Step S234) and ends the operation of the process illustrated in FIG. 19. Furthermore, if the control unit 30B does not receive the transmission characteristic from the transmission device 2 provided immediately upstream (No at Step S223), the control unit 30B ends the operation of the process illustrated in FIG. 19.

Each of the transmission devices 2 that performs the third negotiation process illustrated in FIG. 19 transmits the probe signal to the transmission device 2 provided immediately downstream at the first timing. The transmission device 2 provided immediately downstream receives the probe signal sent from the transmission device 2 provided immediately upstream, measures the transmission characteristic on the basis of the received probe signal, and stores the measured transmission characteristic in the storing unit 43. Furthermore, the transmission device 2 attaches, at the second timing, the device number of the transmission end to the transmission characteristic that is being stored in the storing unit 43 and transmits the subject transmission characteristic to the transmission device 2 provided immediately downstream. When the transmission device 2 provided immediately downstream receives the transmission characteristic from the transmission device 2 provided immediately upstream, the transmission device 2 attaches the device number at the transmission end to the transmission characteristic that is being stored in the storing unit 43, concatenates the received transmission characteristic with the transmission characteristic that is being stored in the storing unit 43, and transmits the concatenated transmission characteristics to the transmission device 2 provided immediately downstream. Then, if the transmission characteristic that is being stored in the storing unit 43 is present, each of the transmission devices 2 attaches the device number of the transmission end to the subject transmission characteristic, sequentially concatenates the subject transmission characteristic with the received transmission characteristic, and sequentially transmits the concatenated transmission characteristics to the transmission device 2 provided immediately downstream. Consequently, in the optical transmission system 1B, it is possible to transmit the transmission characteristics of all of the transmission devices 2 in the ring network to the transmission device 2 at each of the transmission ends in one round.

When the transmission device 2 receives the concatenated transmission characteristics from the transmission device 2 provided immediately upstream, the transmission device 2 extracts the transmission characteristic of the own device from the concatenated transmission characteristics on the basis of the device number. Consequently, the transmission device 2 can extracts the transmission characteristic of the own device without setting the predetermined concatenation order.

In the third embodiment, the probe signal is transmitted for each of the transmission devices 2 at the same timing, the transmission characteristic is measured by the transmission device 2 provided immediately downstream, and the measured transmission characteristic is stored in the storing unit 43. Then, each of the transmission device 2 attaches the device number of the transmission device 2 at the transmission end to the transmission characteristic that is being stored in the storing unit 43, concatenates the subject transmission characteristic with the transmission characteristic of the transmission device 2 provided immediately downstream, and transmits the concatenated transmission characteristics. Each of the transmission devices 2 attaches the device number of the transmission device 2 provided immediately downstream to the transmission characteristic that is being stored in the storing unit 43, sequentially concatenates each of the transmission characteristics, and transmits the concatenated transmission characteristics to the transmission device 2 at each of the transmission ends. Consequently, the optical transmission system 1B can transmit the transmission characteristics of all of the transmission devices 2 in the ring network to all of the transmission devices 2 at the transmission ends in one round.

Furthermore, because each of the transmission device 2 attaches the device number to the transmission characteristic, each of the transmission device 2 refers to the device number without being aware of the concatenation order and extracts the transmission characteristic of the own device from the concatenated transmission characteristics. Consequently, the transmission device 2 can acquire the transmission characteristic of the own device from the concatenated transmission characteristics without being aware of the concatenation order in one round.

In the optical transmission system 1 according to the first embodiment, if the number of devices in the ring network is four, the number of rounds needed to set the transmission characteristics of the devices is four. In contrast, in the optical transmission system 1B according to the third embodiment, the number of rounds needed to set the transmission characteristics of the devices can be reduced to one. Consequently, communication occupation needed for negotiation in the ring network can be reduced. Furthermore, the effect thereof is large as the number of the transmission devices 2 is increased.

Furthermore, in the first to the third embodiments described above, the ring network constituted by the four transmission devices 2 has been exemplified; however, the number of transmission devices is not limited to four and modifications are possible as needed as long as two or more transmission devices is used.

In the second and the third embodiments described above, the timing at which a request to start negotiation is detected from the NMS 3 is used as the first timing. However, for example, from among the plurality of the transmission devices 2 in the ring network, the timing at which a request to start negotiation of the arbitrary transmission device 2 may also be used and modifications are possible as needed.

In the second and the third embodiments described above, as the second timing, the timing at which sufficient predetermined time needed for the time period from when transmission of the probe signal is started until when the measurement process of the transmission characteristic has been completed is used. However, for example, the timing at which a request is detected from the NMS 3 may also be used and modifications are possible as needed.

In the first and the third embodiments described above, the device numbers are attached to the transmission devices 2; however, attachment is not limited to a number and any can be used as long as the transmission devices 2 can be identified. For example, a symbol, such as a letter of the alphabet may also be used and modifications are possible as needed. Furthermore, sequence numbers are attached as the device numbers; however, the numbers are not limited to the sequence numbers and modifications are possible as needed.

In the first embodiment described above, when the transmission device 2 completes the setting of the transmission characteristic of the own device, the transmission device 2 increments the device number m by 1 and transmits the label information "0m" to the transmission device 2 provided immediately downstream. Then, the transmission device 2 provided immediately downstream refers to the label information and ends the negotiation operation when the device number in the label information exceeds the total number of devices. However, the transmission device 2 may also end, without transmitting the label information to the transmission device 2 provided immediately downstream, the negotiation operation by setting an end flag when the setting of the transmission characteristic of the own device has been completed.

In the first to the third embodiments described above, the transmission characteristic of each of the transmission devices 2 in the ring network is transmitted by using the optical transmission lines 4 by rounding the ring network. However, instead of using the optical transmission lines 4, the control lines that are different from the optical transmission lines 4 may also be used for the transmission characteristic and modifications are possible as needed.

Furthermore, in the first to the third embodiments described above, the optical transmission system 1 that uses the DMT modulation technique is exemplified; however, the optical transmission system that uses another multicarrier modulation technique that allocates data to a plurality of SCs and that modulates data allocated for each SC may also be used. For example, it may also be possible to use the optical transmission system that uses the multicarrier modulation technique, such as various kinds of PSK modulation techniques including the Orthogonal Frequency Division Multiplexing (OFDM) modulation technique or the Quadrature Phase Shift Keying (QPSK) modulation technique. Similarly, Differential Phase Shift Keying (DPSK), 8PSK, or the like may also be used. Namely, a transmission technique that uses a negotiation function that transmits the probe signal between the transmission devices 2, that measures the transmission characteristic on the basis of the probe signal, and that sends back the transmission characteristic to the transmission device at the transmission end may also be used.

Furthermore, the components of each unit illustrated in the drawings are not always physically configured as illustrated in the drawings. In other words, the specific shape of a separate or integrated unit is not limited to the drawings; however, all or part of the unit can be configured by functionally or physically separating or integrating any of the units depending on various loads or use conditions.

Furthermore, all or any part of various kinds of processing functions performed by each unit may also be executed by a central processing unit (CPU), a digital Signal processor (DSP), a field programmable gate array (FPGA), or the like. Furthermore, all or any part of the various kinds of processing functions may also be executed by programs analyzed and executed by the CPU and the like or executed by hardware by wired logic.

The area in which various kinds of information is stored is, for example, a read only memory (ROM) or a random access memory (RAM), such as a synchronous dynamic random access memory (SDRAM), a magneto resistive random access memory (MRAM), a nonvolatile memory (NVRAM), or the like.

According to an aspect of an embodiment, it is possible to ensure negotiation when the transmission characteristic is set between transmission devices in a ring network.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A Discrete Multi-Tone (DMT) transmission device that connects a plurality of DMT transmission devices by a ring network of a one way direction communication, the transmission device comprising a processor, wherein the processor executes a process comprising:
   generating a DMT test signal;
   transmitting the generated DMT test signal to a first DMT transmission device provided immediately downstream in the ring network;
   determining whether a transmission characteristic of the DMT transmission device on the basis of the DMT test signal measured by the first DMT transmission device is acquired from a second DMT transmission device provided immediately upstream by rounding the ring network in the one way direction communication;
   setting, on the basis of the acquired transmission characteristic when the transmission characteristic of the DMT transmission device is acquired, a control level related to the transmitting;
   measuring, when the DMT test signal is received from the DMT second transmission device, the transmission characteristic on the basis of the DMT test signal; and
   attaching, to the measured transmission characteristic, identification information of identifying one DMT transmission device that sends out the DMT test signal, wherein the transmitting includes transmitting the transmission characteristic to which the identification information is attached to the first DMT transmission device in order to send, by rounding the ring network in the one way direction communication, the transmission characteristic to the one DMT transmission device that sent out the DMT test signal.

2. The DMT transmission device according to claim 1, wherein, when the determining includes receiving the transmission characteristic from the second transmission device, the determining includes determining whether, on the basis of the identification information that is attached to the transmission characteristic, the transmission characteristic of the transmission device is acquired.

3. The DMT transmission device according to claim 1, wherein the processor executes the process further comprising:
measuring, when the DMT test signal is received from the DMT second transmission device, the transmission characteristic on the basis of the DMT test signal; and
storing the measured transmission characteristic in a storage, wherein
when the DMT transmitting includes detecting a predetermined timing, the transmitting includes transmitting the transmission characteristic that is stored in the storage to the first DMT transmission device in order to transmit, by rounding the ring network in the one way direction communication, the transmission characteristic to the DMT transmission device that sent out the DMT test signal.

4. The DMT transmission device according to claim 3, wherein the processor executes the process further comprising concatenating in a predetermined order when the transmission characteristic is received from the second DMT transmission device, the transmission characteristic that is stored in the storage with the received transmission characteristic, wherein
the transmitting includes transmitting the concatenated transmission characteristics to the first DMT transmission device.

5. The DMT transmission device according to claim 4, wherein, when the setting includes receiving the transmission characteristic from the second DMT transmission device, the setting includes extracting, on the basis of the predetermined order, the transmission characteristic of the DMT transmission device from the concatenated transmission characteristics and setting the control level on the basis of the extracted transmission characteristic.

6. The DMT transmission device according to claim 1, wherein the processor executes the process further comprising:
measuring, when the DMT test signal is received from the second DMT transmission device, the transmission characteristic corresponding to the DMT test signal;
storing the measured transmission characteristic in a storage; and
attaching, to the transmission characteristic that is stored in the storage when a predetermined timing is detected, identification information of identifying the DMT transmission device that sends out the DMT test signal, wherein the transmitting includes transmitting the transmission characteristic to which the identification information is attached to the first DMT transmission device in order to transmit, by rounding the ring network in the one way direction communication, the transmission characteristic to the DMT transmission device that sent out the DMT test signal.

7. The DMT transmission device according to claim 6, wherein the processor executes the process further comprising concatenating, when the transmission characteristic is received from the second DMT transmission device, after the attaching includes attaching the identification information of identifying the one DMT transmission device that sent out the test signal to the transmission characteristic that is stored in the storage, the transmission characteristic to which the identification information is attached with the received transmission characteristic, wherein the transmitting includes transmitting the concatenated transmission characteristics to the first DMT transmission device.

8. The DMT transmission device according to claim 7, wherein, when the setting includes receiving the transmission characteristic from the second DMT transmission device, the setting includes extracting, on the basis of the identification information that is attached to the concatenated transmission characteristics, the transmission characteristic of the transmission device from the concatenated transmission characteristics and setting the control level on the basis of the extracted transmission characteristic.

9. A setting method of a plurality of Discrete Multi-Tone (DMT) transmission devices connected by a ring network of a one way direction communication, the setting method comprising:
generating a DMT test signal, performed by a DMT transmission device;
transmitting the generated DMT test signal to a first DMT transmission device provided immediately downstream in the ring network, performed by the DMT transmission device;
determining whether a transmission characteristic of the DMT transmission device on the basis of the DMT test signal measured by the first DMT transmission device is acquired from a second DMT transmission device provided immediately upstream by rounding the ring network in the one way direction communication, performed by the DMT transmission device;
setting, on the basis of the acquired transmission characteristic when the transmission characteristic of the DMT transmission device is acquired, a control level related to the transmission, performed by the DMT transmission device; measuring, when the DMT test signal is received from the DMT second transmission device, the transmission characteristic on the basis of the DMT test signal, performed by the DMT transmission device; and
attaching, to the measured transmission characteristic, identification information of identifying one DMT transmission device that sends out the DMT test signal, performed by the DMT transmission device, wherein the transmitting includes transmitting the transmission characteristic to which the identification information is attached to the first DMT transmission device in order to send, by rounding the ring network in the one way direction communication, the transmission characteristic to the one DMT transmission device that sent out the DMT test signal.

* * * * *